United States Patent
Koga et al.

(10) Patent No.: US 8,537,819 B2
(45) Date of Patent: Sep. 17, 2013

(54) POWER LINE COMMUNICATION APPARATUS, POWER LINE COMMUNICATION METHOD AND COMMUNICATION APPARATUS

(75) Inventors: Hisao Koga, Fukuoka (JP); Nobutaka Kodama, Fukuoka (JP); Yasushi Yokomitsu, Fukuoka (JP); Yuji Igata, Fukuoka (JP); Masahiko Haraguchi, Fukuoka (JP); Toru Yasukawa, Wakayama (JP)

(73) Assignee: Panasonic Corporation, Osaka (JP)

( * ) Notice: Subject to any disclaimer, the term of this patent is extended or adjusted under 35 U.S.C. 154(b) by 457 days.

(21) Appl. No.: 11/594,978

(22) Filed: Nov. 9, 2006

(65) Prior Publication Data
US 2007/0115973 A1  May 24, 2007

(30) Foreign Application Priority Data

Nov. 10, 2005 (JP) .............................. P. 2005-326268
Nov. 25, 2005 (JP) .............................. P. 2005-339962

(51) Int. Cl.
| | | |
|---|---|---|
| H04Q 7/24 | (2006.01) | |
| H04N 7/173 | (2011.01) | |
| H04N 5/781 | (2006.01) | |
| H04L 27/28 | (2006.01) | |
| H04L 12/28 | (2006.01) | |
| H04H 1/04 | (2006.01) | |
| H04B 10/00 | (2013.01) | |
| H04B 1/38 | (2006.01) | |
| G06F 15/16 | (2006.01) | |

(52) U.S. Cl.
USPC ........... 370/390; 370/338; 370/351; 370/486; 375/219; 375/260; 709/232; 725/91

(58) Field of Classification Search
USPC .................. 370/390, 229–236, 338, 351, 486; 709/221–235; 455/69, 92, 452, 466; 398/140; 375/219, 260; 725/91
See application file for complete search history.

(56) References Cited

U.S. PATENT DOCUMENTS 4,686,999 A * 8/1987 Snyder et al. ................. 600/529
5,572,678 A  11/1996 Homma
(Continued)

FOREIGN PATENT DOCUMENTS

JP        5-207023     8/1993
JP        8-97858      4/1996
(Continued)

OTHER PUBLICATIONS

Japanese Office Action dated Nov. 16, 2010 with partial English translation.
(Continued)

Primary Examiner — Andrew Lai
Assistant Examiner — Chuong M Nguyen
(74) Attorney, Agent, or Firm — Dickinson Wright PLLC

(57) ABSTRACT

PLC modems and a PLC communication system that includes the PLC modems receive a multicast packet from a video server of a multicast group. When a MAC address table is set therein, the PLC modems and the PLC communication system convert the multicast packet into a unicast packet and transmit the converted packet to a power line. When no MAC address is set, the PLC modems and the PLC communication system transmit the multicast packet to the power line.

15 Claims, 23 Drawing Sheets

(56) References Cited

U.S. PATENT DOCUMENTS

| | | |
|---|---|---|
| 7,296,083 B2 * | 11/2007 | Barham et al. ............... 709/232 |
| 7,680,207 B2 | 3/2010 | Moon et al. |
| 2001/0028678 A1 * | 10/2001 | Kato et al. .................... 375/222 |
| 2002/0003798 A1 | 1/2002 | Sato |
| 2002/0067763 A1 * | 6/2002 | Suzuki et al. ................ 375/219 |
| 2002/0141379 A1 * | 10/2002 | Davari et al. ................. 370/351 |
| 2002/0162114 A1 * | 10/2002 | Bisher et al. .................... 725/91 |
| 2003/0016123 A1 | 1/2003 | Tager et al. |
| 2003/0147474 A1 * | 8/2003 | Ha et al. ....................... 375/295 |
| 2004/0121788 A1 | 6/2004 | Moon et al. |
| 2004/0136393 A1 | 7/2004 | Insua et al. |
| 2004/0174851 A1 * | 9/2004 | Zalitzky et al. .............. 370/338 |
| 2004/0184514 A1 * | 9/2004 | Heo et al. ...................... 375/148 |
| 2005/0013307 A1 * | 1/2005 | Park ......................... 370/395.53 |
| 2005/0018784 A1 | 1/2005 | Kurobe et al. |
| 2005/0037722 A1 | 2/2005 | Koga |
| 2005/0063479 A1 * | 3/2005 | Propp et al. .................. 375/260 |
| 2005/0078674 A1 | 4/2005 | Koide et al. |
| 2005/0078698 A1 | 4/2005 | Araya |
| 2005/0185215 A1 | 8/2005 | Nishizawa et al. |
| 2005/0190765 A1 * | 9/2005 | Gotoh et al. .................. 370/390 |
| 2005/0201375 A1 | 9/2005 | Komatsu |
| 2005/0249234 A1 | 11/2005 | Kodama et al. |
| 2006/0034294 A1 * | 2/2006 | Isoyama ................... 370/395.42 |
| 2006/0056340 A1 * | 3/2006 | Hottinen et al. ............. 370/328 |
| 2006/0098613 A1 * | 5/2006 | Kish et al. .................... 370/338 |
| 2006/0126668 A1 * | 6/2006 | Kwon et al. .................. 370/486 |
| 2007/0036553 A1 * | 2/2007 | Etemad et al. ............... 398/140 |
| 2009/0141718 A1 | 6/2009 | Higashida |

FOREIGN PATENT DOCUMENTS

| | | |
|---|---|---|
| JP | 2000165304 | 6/2000 |
| JP | 2001-237904 | 8/2001 |
| JP | 2001-320324 | 11/2001 |
| JP | 2001-339458 | 12/2001 |
| JP | 2002-124895 | 4/2002 |
| JP | 2002314466 | 10/2002 |
| JP | 2003-224601 | 8/2003 |
| JP | 2003244038 | 8/2003 |
| JP | 2004-179679 | 6/2004 |
| JP | 2004-292096 | 10/2004 |
| JP | 2004531944 | 10/2004 |
| JP | 2004-364147 | 12/2004 |
| JP | 2005-57644 | 3/2005 |
| WO | 03100996 | 12/2003 |
| WO | 2004/064341 | 7/2004 |
| WO | 2005/096569 | 10/2005 |

OTHER PUBLICATIONS

Japanese Office Action dated Feb. 8, 2011 with partial English translation.

PCT International Search Report dated Feb. 2, 2007.

* cited by examiner

| SATUS | TRANSITION | DESCRIPTION | NOTE |
|---|---|---|---|
| JOIN | IGMP (JOIN) RECEPTION | JOINING MULTICAST GROUP | |
| LEAVE | IGMP (LEAVE) RECEPTION | LEAVING MULTICAST GROUP | |
| QUERY | IGMP (QUERY) RECEPTION | CONFIRMING EXISENCE FROM ROUTER | WHEN CONNECTED TO ROUTER |
| REPORT | IGMP (REPORT) RECEPTION | REPLYING EXISENCE TO ROUTER | WHEN CONNECTED FOR ROUTER |

IGMP PACKET FORMAT

ETHERNET PACKET FORMAT 1

ETHERNET PACKET FORMAT 2

PLC PACKET FORMAT 1

PLC PACKET FORMAT 2

⇒ : MULTICAST DATA  → : UNICAST DATA

⇒ : MULTICAST DATA  → : UNICAST DATA

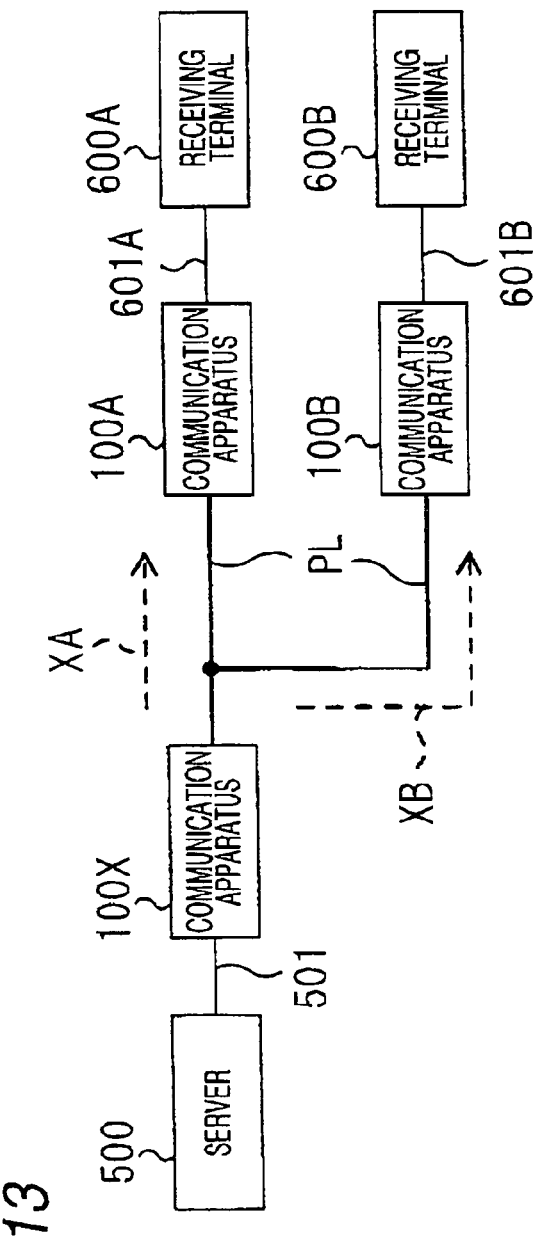
FIG. 13
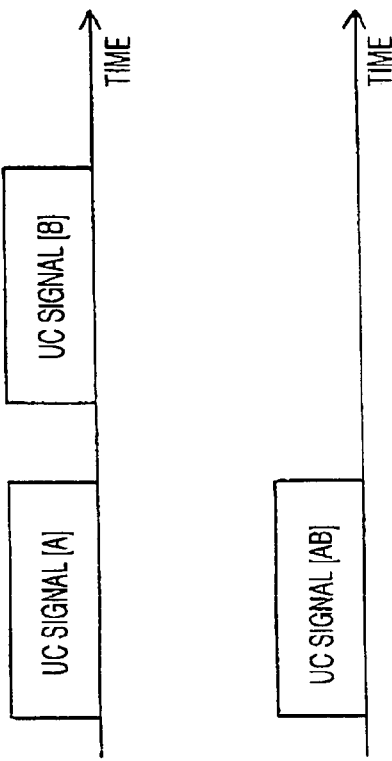
FIG. 14A
FIG. 14B

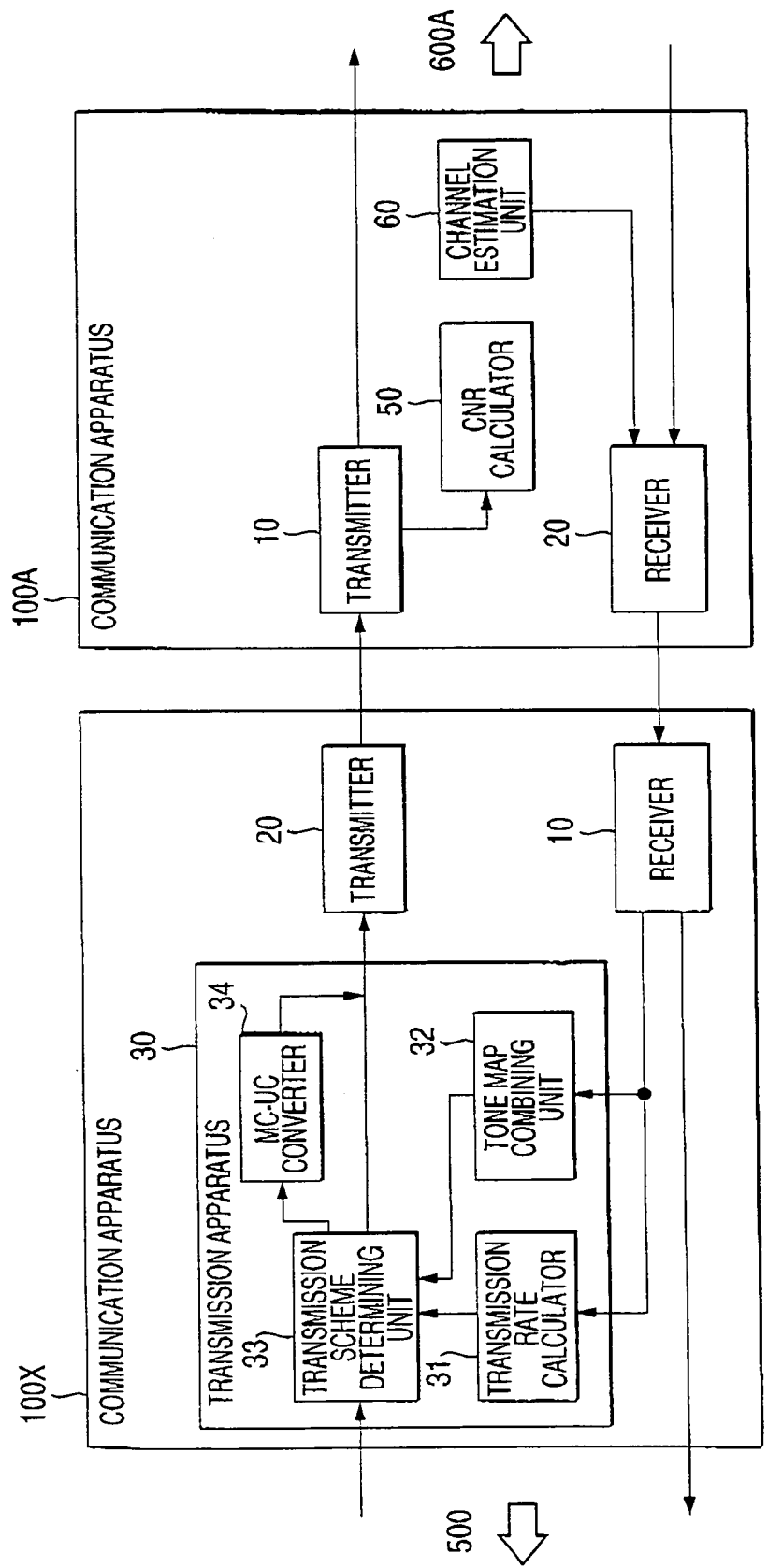

POWER LINE COMMUNICATION APPARATUS, POWER LINE COMMUNICATION METHOD AND COMMUNICATION APPARATUS

BACKGROUND

1. Field of the Invention

The present invention relates to a power line communication apparatus, a power line communication method, and a communication apparatus that have a function to convert multicast communication into unicast communication and that are capable of performing power line communication (hereinafter referred to as PLC) at high quality.

2. Description of Related Art

PLC that performs communication over indoor power lines has recently drawn attention. A currently proposed system even performs communication on power lines in a frequency range of 2 MHz to 30 MHz at a maximum transmission rate of over 100 Mbps in an OFDM modulation scheme, and thus a focus is on access to the Internet and the like from within a LAN and reception of video and audio stream distribution.

In PLC, however, the power lines are not originally designed for data communication. In addition, a number of branch wirings are installed, and a number of electric appliances are connected. Thus, the communication environment changes dynamically. Further, noise, reflection, attenuation, and the like cause data loss, thus resulting in traffic slowdown, transfer delay, and the like, and, in stream distribution, video and audio distortion and communication quality degradation. Proposed to address the problems is a PLC modem that employs impedance matching between the modem and a transmission line so as to maintain communication quality (e.g., Japanese Patent Laid-open Publication 2003-244038).

Further proposed is a PLC modem capable of maintaining communication quality without losing a frequency band (e.g., Japanese Patent Laid-open Publication 2002-314466). The PLC modem on a video transmitter disclosed in the publication simultaneously transmits a plurality of signals in a frequency division multiplexing system. Using two types of packets, an original packet and a duplicate packet, the PLC modem distributes risk of signal degradation and thus maintains the communication quality.

Even with such PLC modem, however, it is inevitable that communication environments where PLC modems are installed are statically and dynamically different by location on the PLC network. It is thus impossible that one PLC modem performs quality communication at an equal transmission rate to all of the plurality of PLC modems. Therefore, simultaneous multiple transmission, such as broadcast and multicast, is generally performed at a low rate (about 2 Mbps), which allows the most stable communication.

Multicast is generally used for TV broadcast and other video and audio stream distribution over an IP network, such as the Internet and the like. In transmission of packets for TV broadcast and the like to an IP device over the PLC network, quality degradation (image distortion) has occurred in a high-bit-rate program (2 Mbps or more) due to data loss.

As described above, the communication quality deteriorates in PLC, since the power lines used are not originally designed for data communication; a number of branch wirings are installed; and a number of electric appliances are connected. Although the PLC modems disclosed in the above-described publications can improve the communication quality to a certain level, the PLC modems cannot ensure the communication quality.

That is, it is impossible that one PLC modem performs quality communication at the equal transmission rate to all of the plurality of PLC modems, since the PLC modems are provided in different communication environments due to the branch wirings and electric appliances connected to the power lines. Thus, the most stable communication at the low rate (about 2 Mbps) is employed for simultaneous multiple transmission, including broadcast and multicast. However, multicast is generally employed in TV broadcast and other stream distribution over the IP network, such as the Internet and the like, which are performed at the high bit rate.

Therefore, image and sound are inevitably distorted in the high-bit-rate program due to quality degradation caused by data loss, when the packets for TV broadcast and the like on the IP network are transmitted to the IP device via the PLC network.

SUMMARY

An object of the present invention is to provide a power line communication apparatus, a power line communication method, and a communication apparatus that are capable of ensuring quality communication, even in multicast communication via a PLC network on which a communication status is prone to fluctuate.

To address the above-described problems, the power line communication apparatus, which is connectable to a power line to which another power line communication apparatus is connected, includes: a receiver that receives a packet having a first address used for multicast as a destination address; a packet converter that converts the destination address of the packet received by the receiver into a second address used for unicast; a modulation scheme determining unit that determines a modulation scheme in accordance with a status of the power line between the power line communication apparatus and the another power line communication apparatus; and a packet transmitter that transmits to the another power line communication apparatus, the packet whose destination address is converted to the second address by the packet converter, based on the modulation scheme determined by the modulation scheme determining unit.

An aspect of the present invention provides the power line communication apparatus connectable to the power line to which the another power line communication apparatus is connected. The power line communication apparatus includes: the receiver that receives the packet having the first address used for multicast as the destination address; the packet converter that converts the destination address of the packet received by the receiver into the second address used for unicast; the modulation scheme determining unit that determines the modulation scheme in accordance with the status of the power line between the power line communication apparatus and the another power line communication apparatus; and the packet transmitter that transmits to the another power line communication apparatus, the packet whose destination address is converted to the second address by the packet converter, based on the modulation scheme determined by the modulation scheme determining unit. The power line communication apparatus selects a suitable modulation scheme according to the power line status, thus capable of switching multicast communication to unicast communication within a PLC network. Even when a transmission rate is limited on the PLC network, the power line communication apparatus prevents video and audio distortion caused by the limit, and thus ensures quality communication.

A further aspect of the present invention provides a communication apparatus capable of transmitting data to a plurality of receiving communication apparatuses. The communication apparatus includes a reception information obtaining unit that obtains reception information indicating a reception status from each of the plurality of receiving communication apparatuses at least used for multicast communication; and a transmission processor that determines a transmission scheme of transmitted data for multicast communication for the plurality of receiving communication apparatuses, based on the reception information obtained by the reception information obtaining unit.

The configuration above allows communication using the transmission scheme determined based on the reception status of the receiving communication apparatuses, thus enabling efficient distribution of the data for multicast communication.

BRIEF DESCRIPTION OF THE DRAWINGS

FIG. 13 is a block diagram illustrating an overview of a communication system according to a third embodiment;

FIGS. 14A and 14B illustrate a concept of multicast communication and unicast communication;

FIG. 18 is a block diagram illustrating a general configuration of a communication apparatus according to a third embodiment;

DETAILED DESCRIPTION

First Embodiment

Figure 1A:
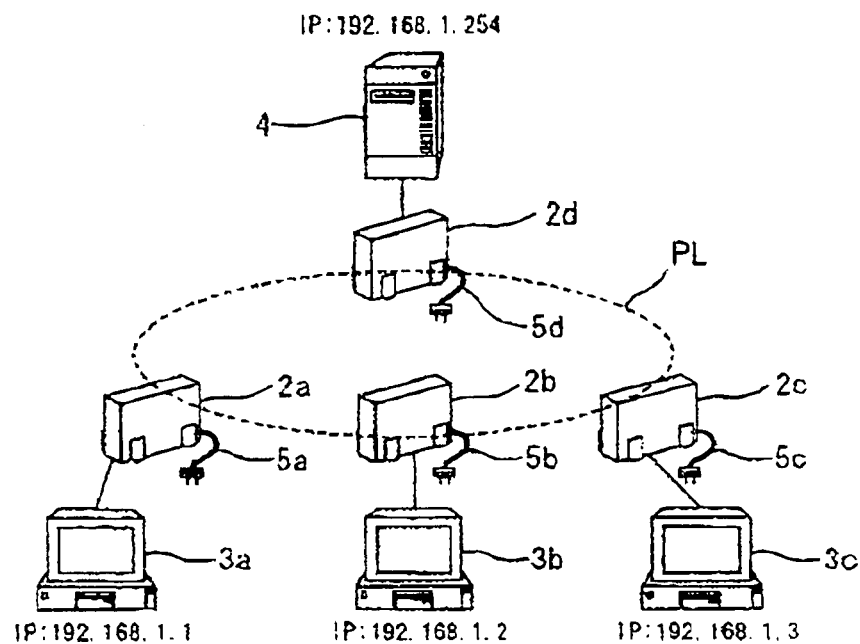
FIG. 1A is an external view of a PLC communication system according to a first embodiment.
Figure 1B:
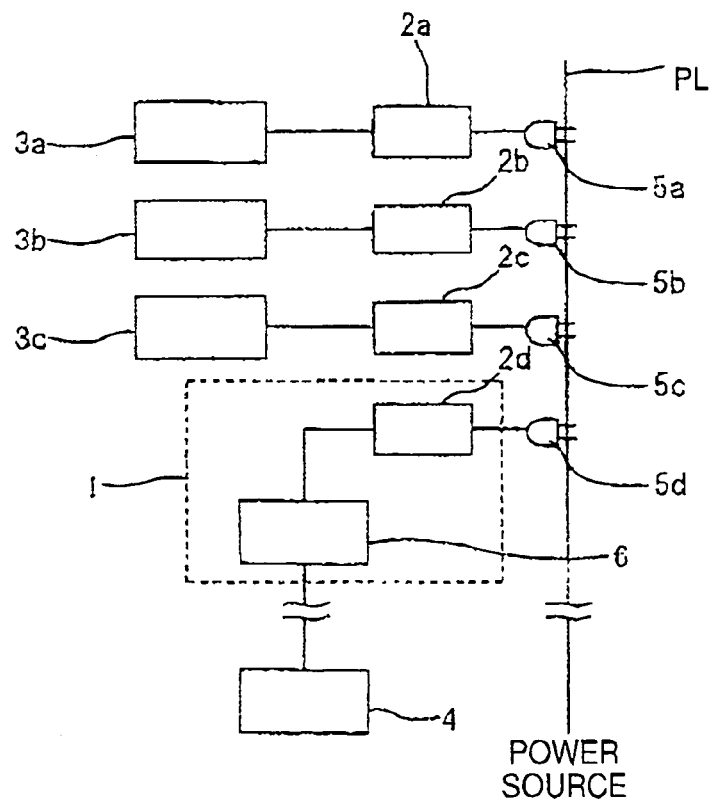
FIG. 1B illustrates a configuration of a PLC communication system different from FIG. 1A.

Provided below are explanations on a PLC relay device, a PLC communication system, and a PLC communication method according to a first embodiment. Shown in FIGS. 1A and 1B is power line PL, which transmits a power signal and outputs the power signal via a connector (not shown in the drawings) provided inside or outside of a building. Power line PL is also used for data communication as a transmission line on a PLC network.

Further shown are PLC modems 2a, 2b, 2c, and 2d (hereinafter collectively referred to as PLC modems 2) and IP devices 3a, 3b, and 3c (hereinafter collectively referred to as IP devices 3), which are connected to PLC modems 2. IP device 3 is provided with a set-top box (STB) capable of receiving video and audio stream distribution, or a display apparatus, such as a PC and the like. IP device 3 is not particularly limited to the STB or PC, as far as IP device 3 has a communication function that allows packet communication using an IP address. Further shown are video server 4, which performs video and audio stream distribution; and plugs 5a, 5b, 5c, and 5d provided for respective PLC modems 2.

IP devices 3a, 3b, and 3c and video server 4 of the first embodiment are Ethernet devices. IP devices 3 are connected to PLC modems 2 over Ethernet (network). PLC modems 2 are connected via power line PL. One of PLC modems 2 is connected to a default gateway (hereinafter described) via the Ethernet, and then to video server 4 on the Internet. In the first embodiment, video server 4 serves as a distribution server. However, the distribution server is not limited to video server 4, but may be any server capable of real-time stream distribution and broadcast of data to group members in multicast.

Router 6 shown in FIG. 1B performs routing to outside of the network when video server 4 is located in a separate area. Besides above-described PLC modem 2, the PLC relay device may be a relay device, such as a bridge that performs communication processing up to layer 2; a router that performs communication processing up to layer 3; a gateway that performs communication processing up to layer 7; and the like. When transmitting video server 4 is located in the separate area as shown as I in FIG. 1B, a combination of PLC modem 2 and router 6 is also acceptable.

In stream distribution from video server 4 to IP devices 3 of the first embodiment, multicast is used since multicast is suitable for transmitting data to a plurality of IP devices, in addition to IP devices 3. An IP address in multicast falls into class ID, which is selected from "224.0.0.0 to 239.255.255.255" and indicates a group address. The above-described plurality of IP devices that perform stream distribution constitute a group that shares one group address. On the Ethernet, which allows data communication over TCP/IP complying with IEEE 802.3, the class-D IP address is automatically associated, thus easily enabling IP multicast over the Ethernet. Further, a MAC address at layer 2 is described as a combination of a 3-byte vendor ID and a 3-byte serial number. A MAC address for multicast, which is hereinafter referred to as a MAC address (multicast), is an ID described as the 3-byte vendor ID with a last bit of a first one byte converted, such as, for example, the last bit of the first one byte "00" in "01-00-5E" converted to "01-00-E-0A-0A-0A." The MAC address (multicast) is an example of a multicast address. The multicast address is a MAC address having a format indicating that the last bit in the first byte in the vendor ID is "1." The multicast address is not limited to the above-mentioned format. The multicast address may have any format as far as the multicast address is used for multicast.

IGMP (Internet Group Management Protocol) is provided as a protocol to manage a multicast group. The protocol manages joining, leaving, and remaining in the multicast group. More specifically, to have a multicast packet forwarded to PLC modems 2 and router 6, PLC modems 2 and router 6 need to know that a receiver is connected thererunder to receive the multicast packet. Transmitting an IGMP frame (an IGMP packet) allows such management. The IGMP packet might as well be referred to as a frame rather than a packet (in case of layer 2 and the like), but hereinafter referred to as the packet except for such case.

Thus, IP device 3a, which has joined a predetermined multicast group shown in FIG. 1A, is connected to video server 4 via in an order of the first Ethernet, the PLC network, and the second Ethernet. Once IP device 3a becomes a member, video and audio data are multicast via each network in a reverse direction for stream distribution. However, in the PLC communication system having PLC modems 2 included in the PLC network of the first embodiment, the video and audio data are not multicast, but unicast as shown in FIG. 1A. Thereby, packet discard on the PLC network is reduced, and thus quality stream distribution is achieved.

Figures 2, 3:
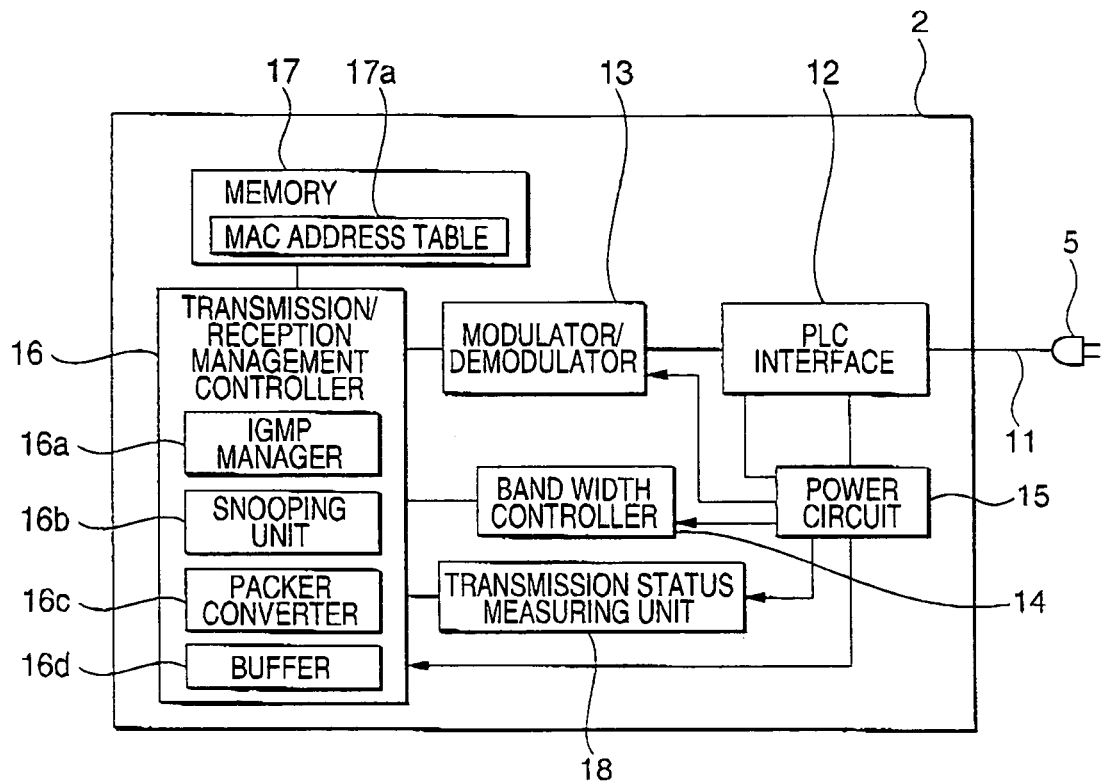
FIG. 2 illustrates a configuration of a PLC relay device according to the first embodiment.
FIG. 3 illustrates IGMP control statuses according to the first embodiment.
Figure 4:
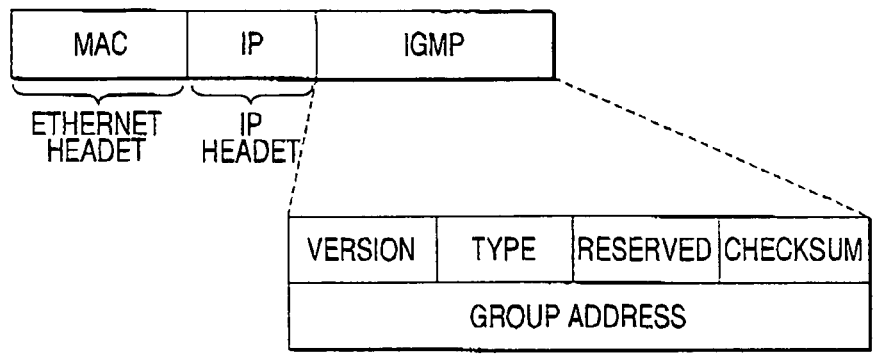
FIG. 4 illustrates an IGMP packet format according to the first embodiment.

FIG. 3 illustrates IGMP control statuses; FIG. 4 illustrates an IGMP packet format. As shown in FIG. 3, IGMP includes four control statuses "Join," "Leave," "Query," and "Report." Receiving IGMP (join) is a notice to join the multicast group. Receiving IGMP (leave) is a notice to leave the multicast group. Receiving IGMP (query) is a confirmation from the router asking whether the device remains as the member. Receiving IGMP (report) is a reply to the router informing that the device remains as the member.

The packet format used in IGMP is as shown in FIG. 4. The MAC address describes an Ethernet destination MAC address and an Ethernet source MAC address, which serves as a destination MAC address (multicast) after joining the multicast group. The IP address describes a group address that the device wants to join, such as, for example, "224.10.10.10;" and a source IP address. As described above, the destination MAC address (multicast), which is associated with the IP address (the group address), is the group address. In the packet format used in IGMP for PLC, a PLC MAC address header is attached to form a control frame, and a payload is encapsulated.

Of IGMP versions v1 to v3, v1 defines a message type "0x01" as a membership query and "0x02" as a membership report. IGMP (join) is the membership report issued to join the group, where "0x02" is input as a type. IGMP (leave) includes a type "0x17" defined in v2. In v1, however, IGMP (leave) is not issued for notification of leaving the group, but leaving is recognized through aging.

Described below is a configuration of PLC modem 2 of the first embodiment. In FIG. 2, cable 11 is provided with plug 5; and PLC interface 12 separates a power signal and a data signal from a signal received from power line PL, and superimposes a modulated data signal on the power signal PLC interface 12 may perform communication in diversity mode, and transmission/reception management controller 16 (hereinafter described) may process data, thus further ensuring communication over the PLC network.

Modulator/demodulator 13 modulates a data signal for transmission so as to generate a signal in a selected transmission band, and demodulates the data signal separated by PLC interface 12. Bandwidth controller 14 controls modulator/demodulator 13 based on a control signal. More specifically, bandwidth controller 14 controls modulator/demodulator 13 so as to generate a transmitted signal in a specific transmission band designated by the control signal. Bandwidth controller 14 may secure the transmission band as a predetermined frequency in FDMA (frequency division multiple access) or as a predetermined transmission time in a predetermined frequency band in TDMA (time division multiple access).

Modulator/demodulator 13 generates the signal in the specific transmission band using the transmitted data signal, according to an instruction from bandwidth controller 14. Power circuit 15 supplies the power signal separated by PLC interface 12 to modulator/demodulator 13, PLC interface 12, and bandwidth controller 14 of PLC modem 2.

In FIG. 2, transmission/reception management controller 16 controls PLC communication. IGMP manager 16a, which is provided in transmission/reception management controller 16, manages the IGMP control statuses. Snooping unit 16b performs snooping of information at layer 2 of a received IGMP frame, such as hereinafter described IGMP (join) and the like, and generates MAC address table 17a or an IP address table. Packet converter 16c converts multicast into unicast, referring to MAC address table 17a or the IP address table, when receiving a multicast packet from video server 4. Buffer 16d is mounted to a chipset of transmission/reception management controller 16, so as to buffer packet data.

Transmission/reception management controller 16 is a function performing unit implemented as software, as a program is loaded on a processor Similarly, IGMP manager 16a, snooping unit 16b, and packet converter 16c are also function performing units implemented as software.

Further provided is memory 17. MAC address table (conversion table) 17a is generated by snooping unit 16b when performing snooping of the information at layer 2 of the IGMP frame. MAC address table 17a is used to check which IP device 3 wants to receive data from the multicast group and to which PLC modem 2 IP device 3 is connected. MAC address table 17a is included in memory 17.

The first embodiment below mainly describes a case where MAC address table 17a is used. Since the destination MAC address (multicast) is associated with the IP address (the group address), a key for packet management may be changed from the MAC address to the IP address. In this case, the IP address (not shown in the drawing) is generated through snooping of the IP address at layer 3. The IP address is used to check which IP device 3 wants to receive the data from the multicast group and to which PLC modem 2 IP device 3 is connected. A multicast MAC address and a multicast IP address mean the MAC address (multicast) and the IP address (the group address) respectively herein described. Transmission status measuring unit 18 measures a transmission rate of a packet at a predetermined time interval, and measures jitter caused by uneven transfer time.

Figure 5A:
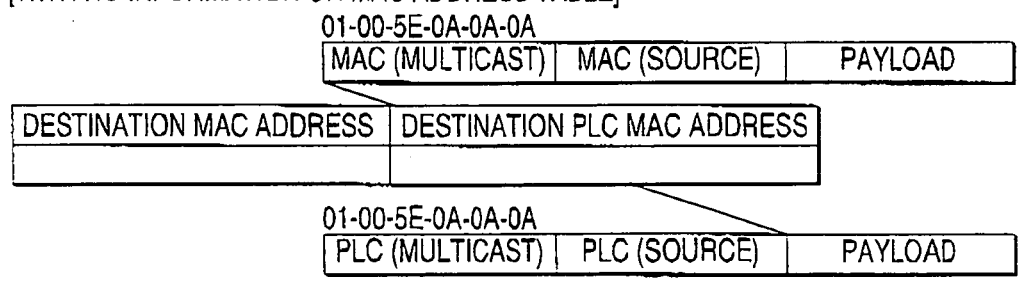
FIG. 5A illustrates a MAC address table according to the first embodiment.

Described below are the MAC address table and packet formats when multicast is converted into unicast and when not converted, with reference to FIGS. 5A, 5B, 6A to 6D, 7, and 8. FIG. 5A illustrates the MAC address table generated when PLC modem 2a transmits IGMP (join) (see FIG. 7) and PLC modems 2b, 2c, and 2d receive the packet. As an example, the Ethernet destination MAC address (multicast) "01-00-5EA-0A-0-0A" and the destination PLC MAC address "a" are associated and stored. When the IP address table is used, the multicast IP address, instead of the destination MAC address (multicast), is associated with the destination PLC IP address. The destination PLC MAC address is an example of a unicast address. The unicast address is a MAC address having a format indicating that the last bit in the first byte in the vendor ID is "0." The unicast address is not limited to the above-mentioned format. The unicast address may have any format as far as the unicast address is used for unicast.

PLC packet conversion information TI shown in FIG. 5A is an example of conversion information. The conversion information indicates an address that allows conversion between a multicast packet and a unicast packet. PLC packet conversion information TI herein is configured with the destination MAC address and the destination PLC MAC address as shown in FIG. 5A.

Figure 5B:
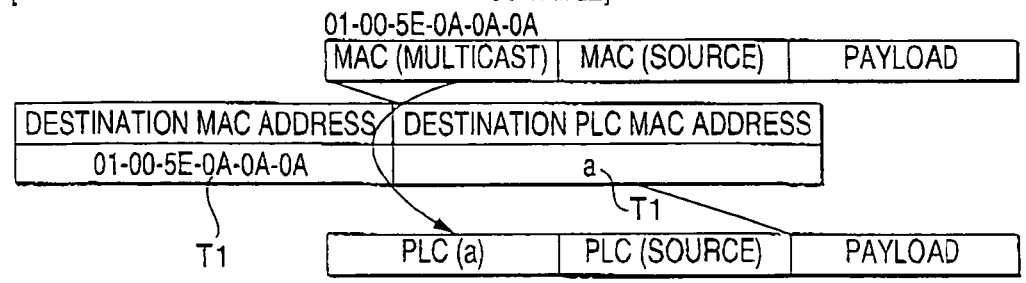
FIG. 5B illustrates conversion from multicast to unicast according to the first embodiment.

Of PLC modems 2 of the first embodiment, PLC modems 2b, 2c, and 2d, excluding PLC modem 2a that has received IGMP (join) from IP device 3, generate MAC address tables 17a so as to check which IP device 3 wants to receive the data from the multicast group. Further, when PLC modem 2 of the first embodiment receives a multicast packet from the distribution server, packet converter 16c refers to MAC address table 17a. When PLC packet conversion information TI is input (set), packet converter 16c encapsulates the packet, converts the packet from multicast to unicast, and transmits the packet in the PLC packet format. When PLC packet conversion information TI is not input (set), packet converter 16c transmits the packet in the PLC packet format as multicast with no conversion. FIG. 5B illustrates the two cases of transmission.

Figure 6A:
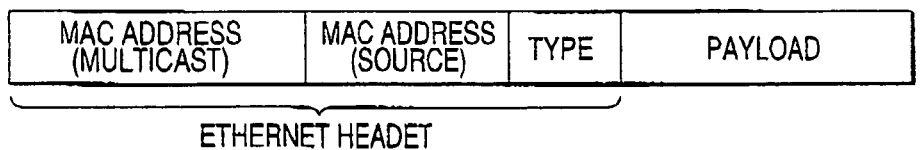
FIGS. 6A to 6D illustrate packet formats according to the first embodiment.
Figure 6B:
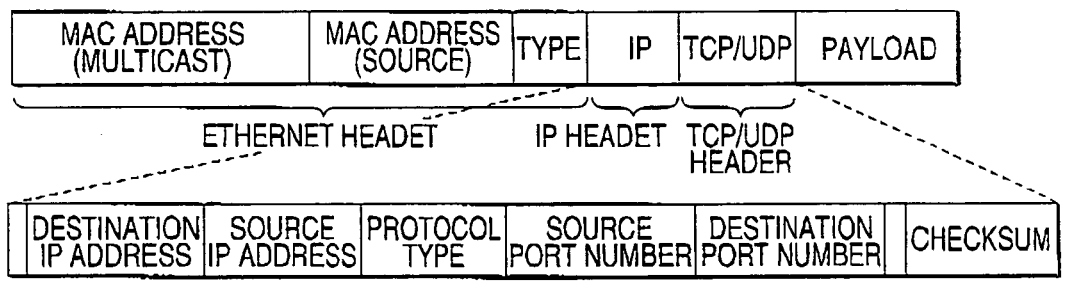
Figure 6C:
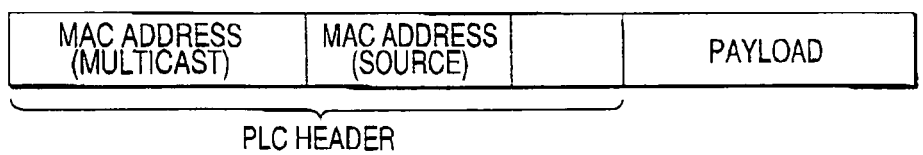
Figure 6D:
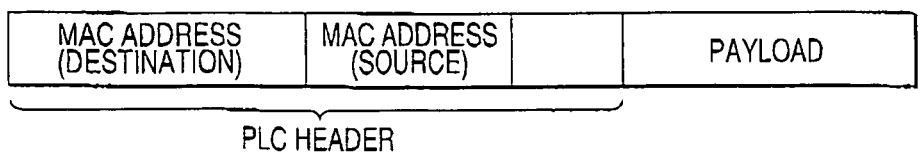

More specifically, the packet format of the received Ethernet multicast packet addressed to IP device 3 is as shown in FIGS. 6A and 6B. A protocol number is written in a format type shown in FIG. 6A. For example, "0800" represents Internet IP (IPv4). FIG. 6B shows a packet including the protocol, which is transmitted from the source. The packet formats on the PLC network are as shown in FIGS. 6C and 6D. FIG. 6C shows the PLC multicast packet format, FIG. 6D shows the PLC unicast packet format.

Therefore, when PLC packet conversion information TI is input (set) to MAC address table 17a in FIG. 5B, packet converter 16c performs multicast-to-unicast conversion as shown in a lower half of FIG. 5B. More specifically, the destination MAC address "01-00-5E-0A-0A-0A" in the Ethernet header is converted into the destination PLC MAC address "a," and the source MAC address in the Ethernet header into the source PLC MAC address, so as to form a PLC header. The received Ethernet multicast packet remains as the payload. Then, the packet is unicast.

Modulator/demodulator 13 of PLC modem 2 performs channel estimation for unicasting. More specifically, modulator/demodulator 13 calculates a noise level of a received signal to check a power line status. Modulator/demodulator 13 herein calculates a carrier-to-noise ratio (hereinafter referred to as CNR) of each subcarrier as the noise level of the received signal. Based on CNR, modulator/demodulator 13 selects a highest-level modulation scheme associated with the calculated CNR and below a predetermined threshold of an error rate, from a plurality of modulation schemes (e.g., SPSK, QPSK, 16 QAM, 64 QAM, and other digital modulation schemes). Further, modulator/demodulator 13 generates a tone map using a value that indicates the selected modulation scheme, and transmits the packet using the tone map. For channel estimation, the modulation scheme does not need to be set per subcarrier. Instead, subcarriers to be used may be divided into a plurality of groups, and the modulation scheme may be set per group of subcarriers.

Thereby, a bandwidth for unicast communication is secured in PLC. Even when PLC interface 12 receives a high-bit-rate multicast packet (e.g., 10 Mbps) from video server 4 and the transmission rate needs to be restricted to low-speed mode (e.g., 2 Mbps), PLC relay devices switch communication between the devices from multicast to unicast, thereby allowing high-speed communication and preventing video and audio distortion that occurs due to the restriction, and thus ensuring quality communication. The IGMP frame is unicast on the PLC network in the format as shown in FIG. 4. The same process is performed in the IP address for the IP address table.

On the contrary, when no PLC packet conversion information TI is input (set) in MAC address table 17a, the packet is converted based on a principle shown in an upper half of FIG. 5B. More specifically, the destination MAC address (multicast) of IP device 3 in the Ethernet header is used without being converted as the destination PLC MAC address (multicast), and the source MAC address in the Ethernet header is used as the source PLC MAC address, so as to form a PLC header. The received Ethernet multicast packet is transmitted as the payload. In this case, when contention occurs on the PLC network, priority is controlled and a bandwidth is not secured. Thus, the relay devices only relay and forward the packet without securing a transmission band.

Figure 7:
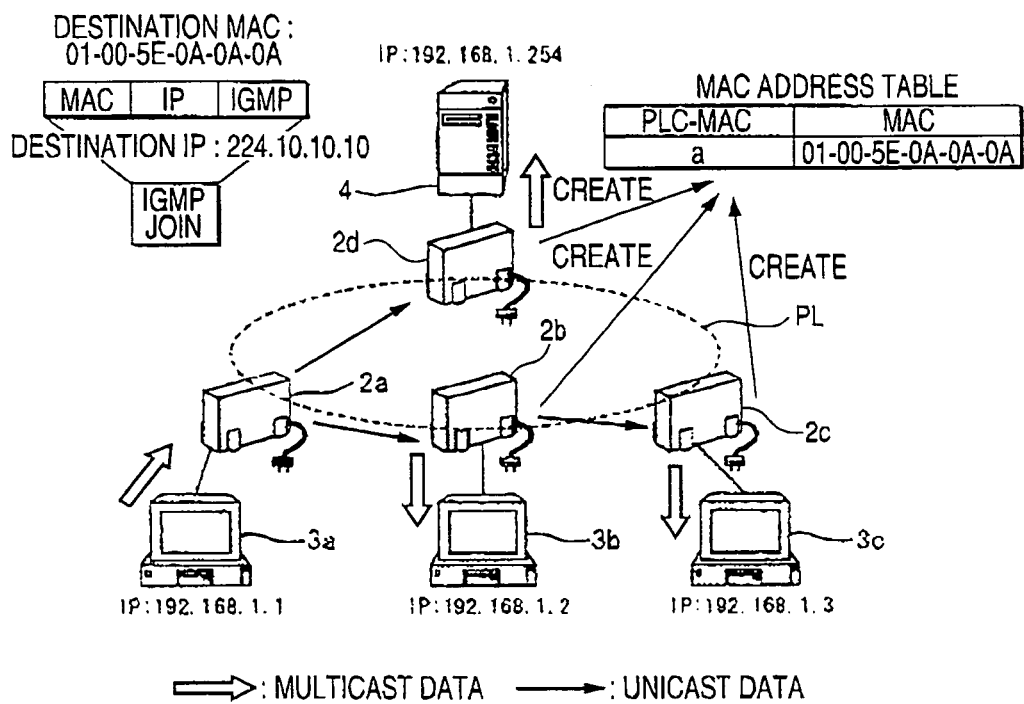
FIG. 7 illustrates reception of IGMP (join) in the PLC communication system according to the first embodiment.

Described next is a communication status of the PLC communication system of the first embodiment during IGMP loin) transmission and stream distribution. As shown in FIG. 7, when IP device 3a multicasts IGMP (join) over the Ethernet, PLC modem 2a unicasts the packet to PLC modems 2b, 2c, and 2d.

PLC modems 2b, 2c, and 2d associate the PLC MAC address of PLC modem 2a, under which IP device 3a is connected, with the MAC address (multicast) of IP device 3a, which is going to join the multicast group, and store the information on MAC address tables 17a. PLC modem 2d, which is connected to video server 4, converts the PLC IGMP (join) frame into an Ethernet packet format for multicast. The MAC address tables of PLC modems 2b, 2c, and 2d herein have the PLC packet conversion information of PLC modem 2, excluding PLC modems 2b, 2c, and 2d. In some cases, however, the PLC packet conversion information of all PLC modems 2, including PLC modems 2b, 2c, and 2d themselves, may be stored on the MAC address tables.

When the plurality of IP devices 3a and 3b multicast IGMP (join) to join the same multicast group, PLC modems 2a and 2b, under which IP devices 3a and 3b are connected, unicast the packet to remaining PLC modems 2.

Remaining PLC modems 2 associate the PLC MAC addresses of PLC modems 2a and 2b with one multicast group address that includes the plurality of MAC addresses (multicast) of IP devices 3a and 3b as forwarding destinations, and store the information on MAC address tables 17a. PLC modem 2d, which is connected to video server 4, converts the PLC IGMP (join) frame into the Ethernet packet format for multicast. Since one multicast address is associated with the plurality of MAC addresses (multicast) in the PLC packet conversion information in this case, an internally used memory and a search time can be reduced. The PLC MAC address is an example of a second address for unicast. The second address does not need to be the MAC address, but may be the IP address. The multicast address is an example of a first address for multicast.

Figure 8:
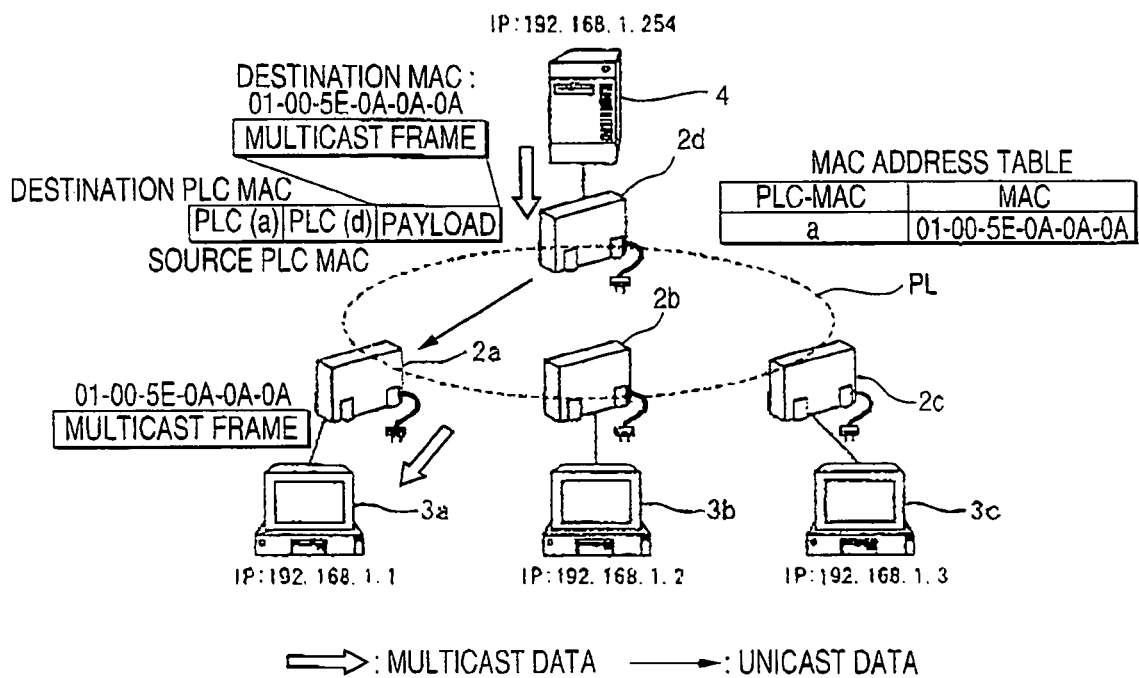
FIG. 8 illustrates stream distribution in the PLC communication system according to the first embodiment.

After receiving IGMP (join), video server 4 transmits a multicast packet to PLC modem 2d for stream distribution as shown in FIG. 8. PLC modem 2d refers to MAC address table 17a, retrieves the Ethernet destination MAC address and the PLC MAC address of PLC modem 2a, encapsulates the multicast packet as a payload, and unicasts the packet to PLC modem 2a. PLC modem 2a then retrieves the multicast packet, and multicasts the packet to IP device 3a.

Further, when the plurality of MAC addresses (multicast) of IP devices 3a and 3b are associated with one multicast group address as the forwarding destinations and stored on MAC address table 17a as described above, PLC modem 2d can transmit a unicast packet sequentially to the plurality of PLC modems 2a and 2b, thus allowing simultaneous reception on the plurality of IP devices 3a and 3b. Thereby, even when the plurality of IP devices 3a and 3b request reception of a same multicast packet, the packet can be delivered to all the devices.

In the PLC modem and the PLC communication system of the first embodiment as described above, multicast-to-unicast conversion is performed on the PLC network when the PLC packet conversion information is available, thus wasting no time on the PLC modem for waiting. Further, the packet is transmitted in high-speed unicast, not in low-speed broadcast, on the PLC network, thus allowing effective use of the transmission band and ensuring quality communication as the packet is retransmitted when an error occurs. Thereby, packet discard, which has frequently occurred on a conventional PLC network, can be prevented.

Described next is auto acquisition and auto release of a frequency band on the PLC modem and the PLC communication system of the first embodiment. As shown in FIG. 3, there are four control statuses of transition in multicast communication obtained through snooping of the IGMP frame. To automatically acquire a band, the plurality of PLC modems 2 that receive IGMP (join) on the PLC network perform snooping of IGMP (join) so as to generate conversion tables. One PLC modem 2 that receives a multicast packet over the Ethernet from video server 4 alone secures a band at a fixed transmission rate (e.g., 10 Mbps) upon receiving a first multicast packet, and transmits the packet. In FIG. 2, when receiving the multicast packet from video server 4, transmission/reception management controller 16 notifies bandwidth controller 14 of the receipt. Bandwidth controller 14 then fixes the transmission rate. When auto acquisition fails, band acquisition is aborted.

Auto band release is described next. For auto band release, PLC modem 2 that receives IGMP (leave) on the PLC network releases a band. When receiving IGMP (leave), transmission/reception management controller 16 notifies bandwidth controller 14 so as to release the band automatically. As described above, auto release may be achieved through aging, instead of withdrawal notification using IGMP (leave). However, aging is reset while IGMP (report) is being received.

Further, when IGMP (leave) is received, the PLC packet conversion information on MAC address table 17a or the IP address table is temporarily invalidated, and is not deleted during a time associated with aging. A reason that the information is not deleted immediately and kept for a while is that a delay occurs while the IGMP frame is being transferred from PLC modem 2 to video server 4, which serves as the stream distribution server. Thereby, when video server 4 continues to multicast (stream distribution) during the time, a multicast packet is prevented from being forwarded to the PLC network since the MAC address or IP address is determined pending.

In the first embodiment, when multicast packet reception starts and bandwidth controller 14 fixes the transmission rate, transmission status measuring unit 18 monitors data that pass through transmission/reception management controller 16. Then, bandwidth controller 14 calculates an actual average rate and updates the band. When there is a difference between the actual average rate and the acquired transmission rate (e.g., 10 Mbps), the acquired band is updated.

Figure 9:
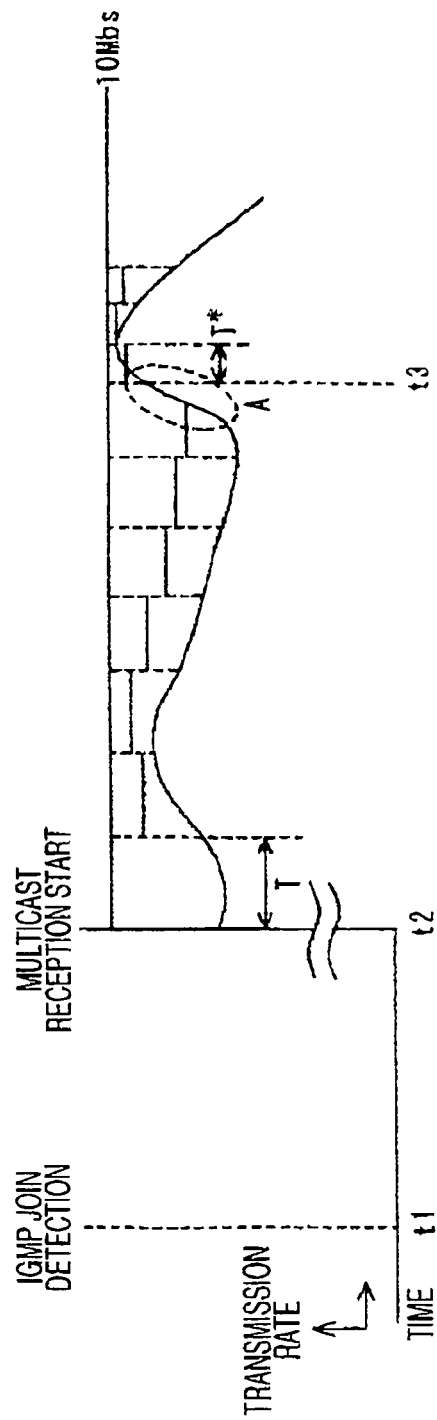
FIG. 9 illustrates bandwidth update in the PLC communication system according to the first embodiment.

In FIG. 9, IGMP (join) is detected at time $t_1$, and reception of a multicast packet starts at time $t_2$. The transmission rate is 10 Mbps, and the actual average rate is calculated in cycle T. For update, transmission/reception management controller 16 calculates a difference between the average rate and the acquired transmission rate. Bandwidth controller 14 then fixes the transmission rate to an intermediate value (a position where a half of the difference is added to a lower rate) so as to perform auto update. A predetermined update process may be performed for the acquired band, only when the difference between the average rate and the transmission rate is greater than a threshold.

Further, when the rate significantly changes as shown with a steep gradient in cycle A before time $t_3$, for example, transmission/reception management controller 16 of the first embodiment monitors gradient change in each cycle. Transmission/reception management controller 16 then shortens cycle T and changes to cycle T* from time $t_3$, when the difference exceeds the threshold. Thereby, the transmission rate can be changed, so that the unstable transmission status on the PLC network is reflected. Further, when a remaining memory in buffer 16d of PLC modem 2 is scarce, cycle T may be shortened. On the other hand, when the remaining memory of buffer 16 is abundant, cycle T may be extended. To adjust cycle T, transmission/reception management controller 16 monitors the remaining memory.

Figure 10:
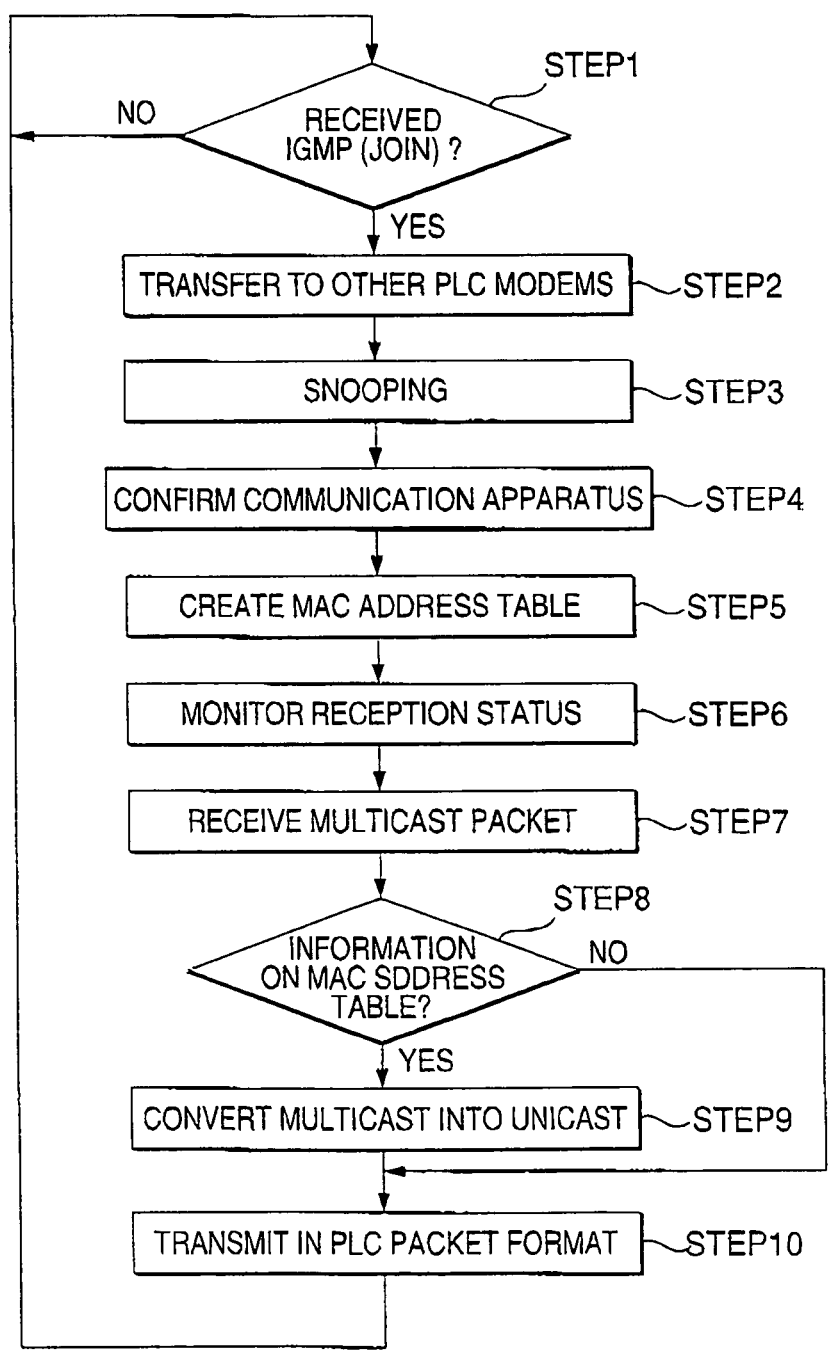
FIG. 10 is a flowchart illustrating a PLC communication method according to the first embodiment.

Described next is the PLC communication method of the first embodiment with reference to FIG. 10. As shown in FIG. 10, one of PLC modems 2, that is, PLC modem 2a, in the PLC communication system receives IGMP (join) from IP device 3a, indicating that IP device 3a wants to join the multicast group (step 1). PLC modem 2a then forwards the packet to PLC modems 2b, 2c, and 2d (step 2) PLC modems 2b, 2c, and 2d perform snooping of the packet (step 3) and confirm which IP device 3 wants to receive data from the multicast group (step 4). Then, PLC modems 2b, 2c, and 2d generate MAC address tables 17a, on which the destination MAC addresses (multicast) of IP devices 3 are associated with the PLC MAC addresses of PLC modems 2b, 2c, and 2d (step 5), PLC modems 2b, 2c, and 2d may generate the IP address tables, on which the multicast IP addresses are associated with the destination PLC IP addresses.

Thereafter, PLC modem 2d monitors a reception status from video server 4, which is the distribution server of the multicast group (step 6). When PLC modem 2d receives a multicast packet from video server 4 (step 7), packet converter 16 refers to MAC address table 17a. When the PLC packet conversion information is input (step 8), packet converter 16 converts the packet from multicast to unicast (step 9), and transmits the packet in the PLC packet format (step 10). When no PLC packet conversion information is input in step 8, packet converter 16 does not convert the packet and keeps the packet as multicast, and proceeds to step 10 to transmit the packet in the PLC packet format.

MAC address table 17a or the P address table may be generated only on PLC modem 2 that receives the multicast packet from video server 4 on the Internet and relays the packet to the PLC network, instead of on all PLC modems 2. To achieve the above, PLC modem 2 connected to the default gateway generates MAC address table 17a or the IP address table, and a PLC relay device that receives the IGMP (join) packet from IP device 3 transmits IGMP (join) on the Ethernet only to PLC modem 2 connected to the default gateway. Alternatively, the PLC relay device may transmit IGMP (join) to all PLC modems 2, so that only PLC modem 2 connected to the default gateway processes the packet PLC modem 2 connected to the default gateway can be identified when each of PLC modems 2 communicates with video server 4 on the Internet for confirmation of a communication path.

The PLC communication method of the first embodiment as described above converts the multicast packet received from the distribution server into unicast that allows 1:1 high-speed communication, and performs unicast communication on the PLC network, when the PLC packet conversion information is available on MAC address table 17a or the IP address table. Thereby, the communication quality on the PLC network is not degraded.

Second Embodiment

The first embodiment above describes a case where, among PLC modems 2a, 2b, 2c, and 2d in the PLC communication system, PLC modem 2a receives a multicast packet. A second embodiment describes a case of multiple links where a plurality of IP devices 3a, 3b, and 3c connected to PLC modems 2a, 2b, and 2c in a PLC communication system, request stream distribution and receive a multicast packet.

Figure 11:
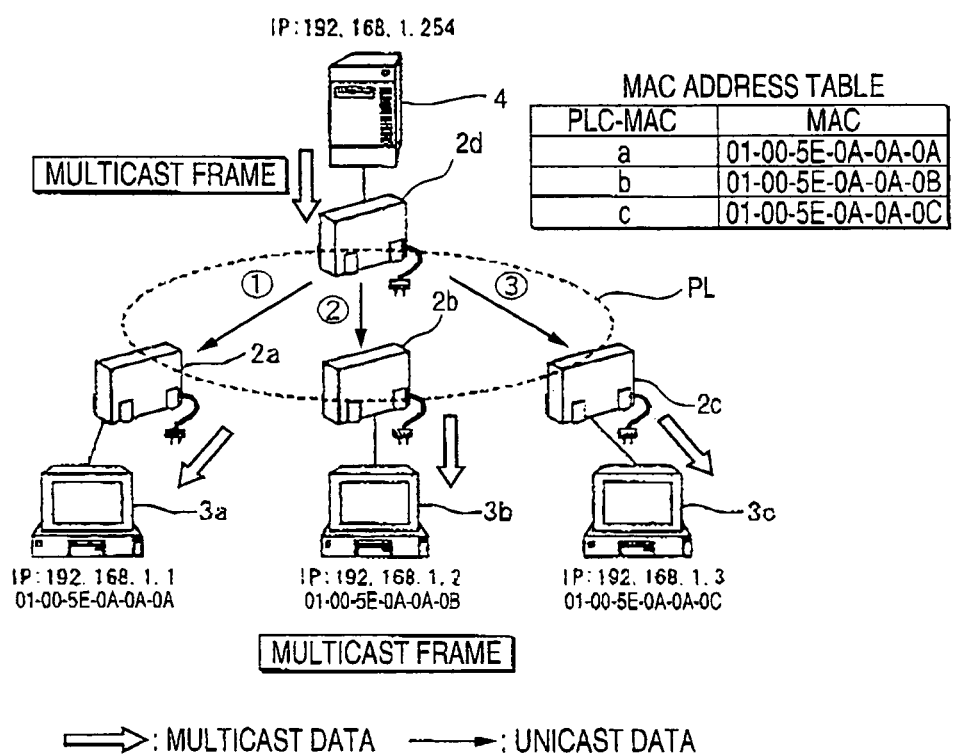
FIG. 11 is an external view of a PLC communication system according to a second embodiment.

When receiving IGMP (join) from PLC modems 2a, 2b, and 2c, PLC modems 2a, 2b, 2c, and 2d generate respective MAC address tables 17a through snooping. MAC address table 17a of PLC modem 2d is as shown in FIG. 11, which excludes the MAC address of PLC modem 2d. An IP address table is similar, except that a packet management key changes from the MAC address to an IP address.

Thereafter, video server 4 transmits a multicast packet to PLC modem 2d for stream distribution as shown in FIG. 11. PLC modem 2d refers to MAC address table 17a; refers to PLC MAC addresses a, b, and c of PLC modems 2a, 2b, and 2c associated with Ethernet destination MAC addresses "01-00-5E-0A-0A-0A," "01-00-5E-0A-0A-0B," and "01-00-5E-0A-0A-0C;" performs multicast-to-unicast conversion with the received multicast packet as a payload; and separately unicasts the packet to PLC modems 2a, 2b, and 2c.

Figure 12:
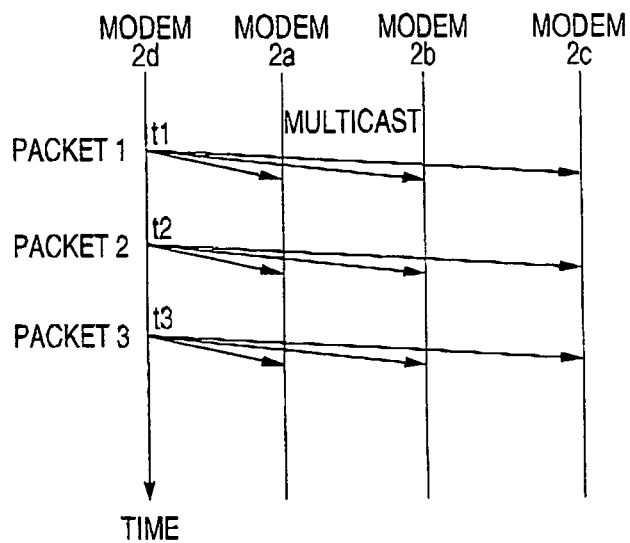
FIGS. 12A to 12C illustrate retransmission procedures in the PLC communication system according to the second embodiment.
Figure 12:
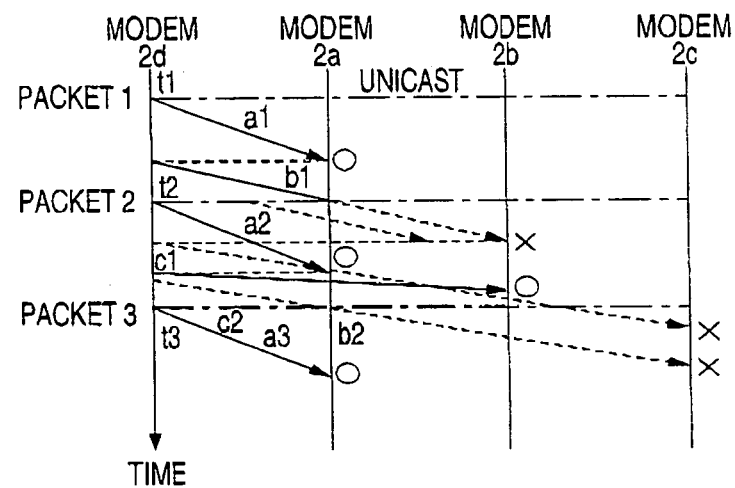
Figure 12:
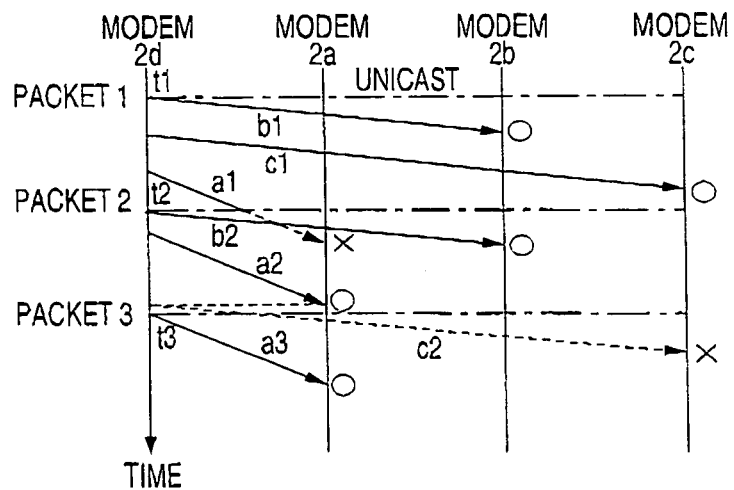

In conventional multicast, which allows simultaneous distribution to a plurality of links, PLC modem 2d can transmit a same resource simultaneously as shown with packets at times $t_1$, $t_2$, and $t_3$ in FIG. 12A. PLC modems 2 of the second embodiment, however, convert the packet from multicast to unicast, and unicast the packet, thus unable to transmit three frames simultaneously. In other words, high-speed unicast communication sacrifices simultaneous transmission. Further, depending on contents of stream distribution, jitter is limited so as to prevent fluctuation in data caused by uneven transfer time, thus leading to a restriction where the number of links cannot exceed the jitter limit.

In the second embodiment, therefore, sequentially changing destinations within a jitter tolerance enables multiple linking In unicast with a transmission order fixed as shown in FIG. 12B, however, three frames to PLC modems 2a, 2b, and 2c are relayed temporally for transmission, thus causing a case where a packet may not be received within a time. More specifically, when transmitting the same resource (packet 1) in the fixed order of PLC modems 2a, 2b, and 2c, packet $a_1$ is transmitted to PLC modem 2a at time $t_1$; packet $b_1$ is transmitted to PLC modem 2b when packet $a_1$ is received; and then packet $c_1$ is transmitted to PLC modem 2c when packet be is received. However, packets $b_1$ and $c_1$ are not received by time $t_2$. A circle o and a cross x herein represent success and failure of reception respectively.

Subsequently for the same resource (packet 2), packet $a_2$ is transmitted to PLC modem 2a at time $t_2$; packet $b_2$ is transmitted to PLC modem 2b when packet $a_2$ is received; and then packet $c_2$ is transmitted to PLC modem 2c when packet $b_2$ is received. However, packet $c_2$ cannot be received by time $t_3$, when packet 3 is transmitted.

In the second embodiment, instead of fixing the transmission order, average transfer times are calculated immediately before transmission by transmission status measuring units 18 of PLC modems 2a, 2b, and 2c, and are compared so that packets are transmitted in order from a short transfer time as shown in FIG. 12C. Thus, although the packets are transmitted in an order of packets $a_1$, $b_1$, and $c_1$ at time $t_1$ in FIG. 12B, the packets are transmitted in order from the short transfer time, that is, packets $b_1$, $c_1$, and $a_1$. Thereby, two packets $b_1$ and $c_1$ can be received, although only one packet $a_1$ is received and packets $b_1$ and $c_1$ cannot be received in FIG. 12B. Similarly, the packets are transmitted in order from the short transfer time of packets $b_2$, $a_2$, and $c_2$ at time $t_2$. Accordingly, the transmission order in the second embodiment, which is determined based on the traffic status, can reduce the number of packets not transferred due to jitter limit.

In the second embodiment as described above, retransmission control where the destinations are sequentially changed within the jitter tolerance enables multiple linking, although simultaneous transmission to the multiple links is not achieved. Further, applying the unicast retransmission function allows stream distribution to the multiple links without increasing a buffer capacity.

Third Embodiment

Explained below is a third embodiment with reference to the drawings. In the third embodiment, a modem that uses a power line as a transmission line and that performs wideband communication (2 to 30 MHz) in a multicarrier communication system (a PLC modem) is used as an example of a communication apparatus.

As shown in FIG. 13, a communication system of the third embodiment includes server 500, which delivers data; and receiving terminals 600A and 600B, which receive the data delivered by the server.

Server 500 and receiving terminals 600A and 600B are connected via power lines PL. Connected between server 500 and power lines PL is communication apparatus 100X, which is an example of a transmitting communication apparatus. Connected between power lines PL and receiving terminals 600A and 600B are communication apparatuses 100A and 100B respectively, each of which is an example of a receiving communication apparatus.

Server 500 and communication apparatus 100X are connected via communication line 501, such as, for example, a coaxial cable and the like, and communicate via Ethernet and the like, for example. Communication apparatus 100X transmits data output from server 500 to power lines PL, and outputs data received from power lines PL to server 500.

Communication apparatus 100A and receiving terminal 600A, and communication apparatus 100B and receiving terminal 600B are connected via communication lines 601A and 601B respectively, such as a coaxial cable and the like, and communicate via the Ethernet and the like, for example. Communication apparatuses 100A and 100B output the data received from power lines PL to receiving terminals 600A and 600B respectively, and transmit the data received from receiving terminals 600A and 600B to power lines PL.

A path between communication apparatuses 100X and 100A is referred to as transmission path XA; a path between communication apparatuses 100X and 100B is referred to as transmission path XB.

FIGS. 14A and 14B illustrate a concept of multicast communication and unicast communication. FIG. 14A illustrates unicast communication; FIG. 14B illustrates multicast communication. In unicast communication, individual computers communicate data on a one-on-one basis. In multicast communication, addresses that identify individual computers are grouped, and data are delivered to the plurality of grouped terminals.

Examples of FIGS. 14A and 14B describe a case where server 500 transmits same data to receiving terminals 600A and 600B.

In unicast communication, it is required to transmit a data frame of UC signal [A] and a data frame of UC signal [B] separately as shown in FIG. 14A. UC signal [A] is a unicast signal directed to receiving terminal 600A. UC signal [B] is a unicast signal directed to receiving terminal 600B.

Meanwhile, in multicast communication, only a data frame of MC signal [AB], which is a multicast signal directed to both receiving terminals 600A and 600B, is transmitted as shown in FIG. 14B. Receiving terminals 600A and 600B receive the data frame of same MC signal [AB].

As described above, transmission needs to be performed in separate bands for receiving terminals 600A and 600B in unicast communication. On the other hand, the same data frame can be transmitted to receiving terminals 600A and 600B in multicast communication, thus requiring a transmission band only for one receiving terminal. As clarified in comparison of FIGS. 14A and 14B, transferring the data to two receiving terminals 600A and 600B in multicast communication requires only half the time of unicast communication.

Thus, when server 500 transfers the data to two receiving terminals 600A and 600B, a total transmission capacity between server 500 and receiving terminals 600A and 600B in multicast communication is only a half of a transmission capacity in unicast communication. Using multicast communication thereby reduces a load to the server and network when the same data are delivered to the plurality of computers.

Figure 15A:
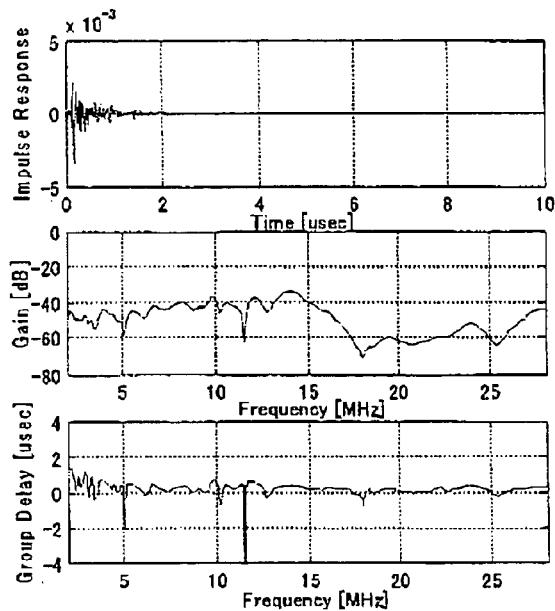
FIGS. 15A and 15B are examples of transmission characteristics on power lines.
Figure 15B:
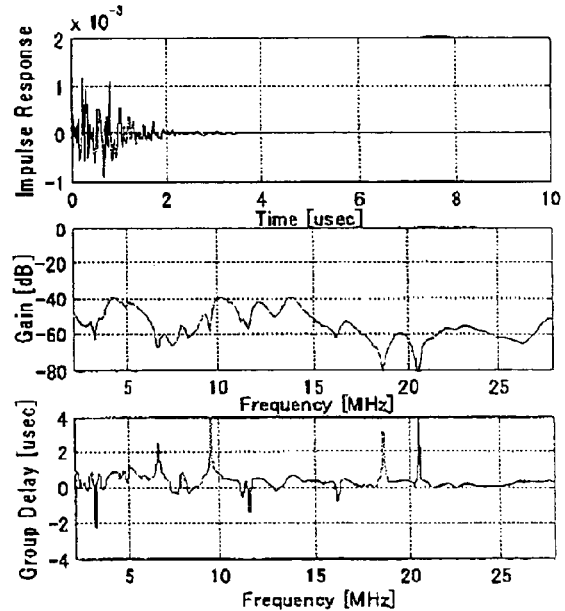
Figure 16A:
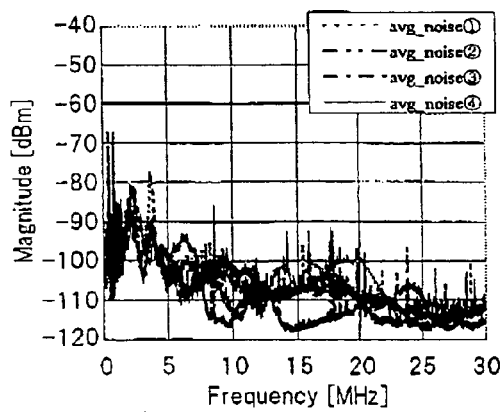
FIGS. 16A and 16B are examples of noise characteristics on the power lines.
Figure 16B:
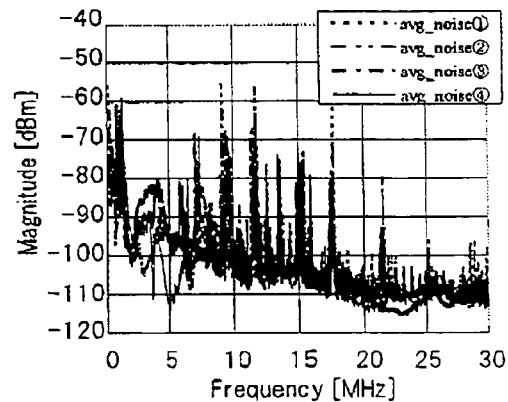
Figure 17A:
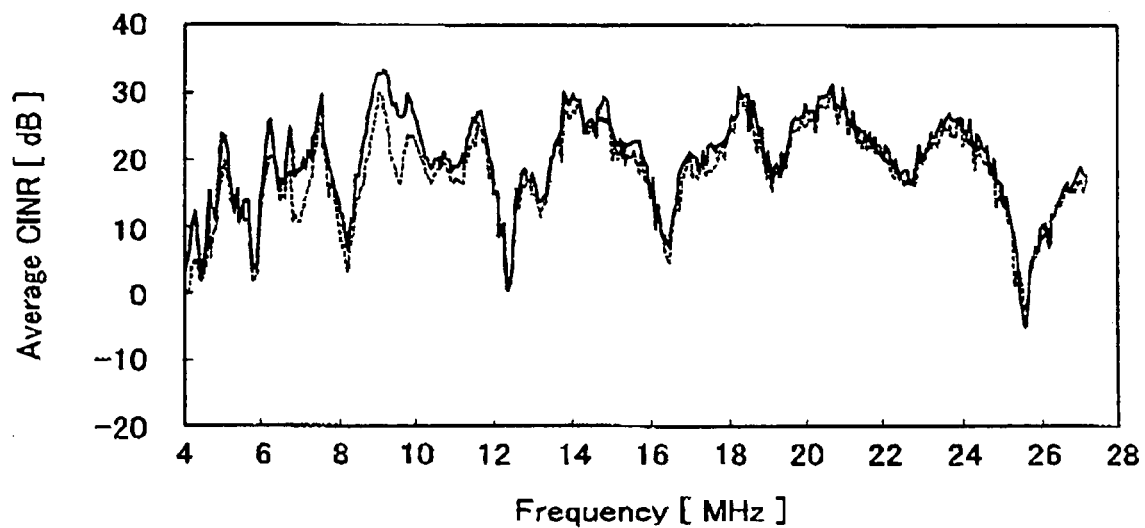
FIGS. 17A and 17B are examples of received signal characteristics on receiving communication apparatuses.
Figure 17B:
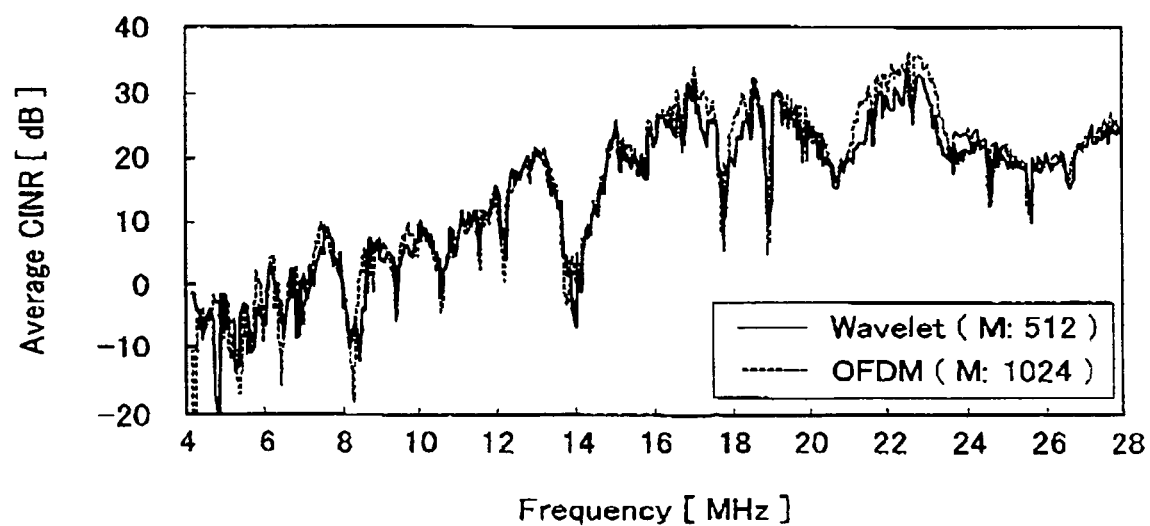

The transmission status is unstable on power lines PL, and characteristics fluctuate according to the time and distance. FIGS. 15A and 15B are examples of transmission characteristics on the power lines. FIG. 15A illustrates the transmission characteristics on transmission path XA; FIG. 15E illustrates the transmission characteristics on transmission path XB. FIG. 16 is an example of noise characteristics on the power lines. FIG. 16A illustrates the noise characteristics on transmission path XA; FIG. 16B illustrates the noise characteristics on transmission path XB. Further, FIGS. 17A and 17B are examples of received signal characteristics on the receiving communication apparatuses. FIG. 17A illustrates average CINR of the received signal on communication apparatus 100A; FIG. 17B illustrates average CINR of the received signal on communication apparatus 100B.

As shown in FIGS. 15A and 15B, frequency characteristics in impulse response, gain, and group delay are different on transmission paths XA and XB. Further, as shown in FIGS. 16A and 16B, the noise characteristics are different on transmission paths XA and XB.

Since the transmission characteristics (the frequency characteristics or noise characteristics) are different on the transmission paths as described above, the received signal characteristics, such as CINR (Carrier to Interference and Noise Ratio) and the like of the received signal, are different on communication apparatuses 100A and 100B as shown in FIGS. 17A and 17B.

In multicast communication, one data frame is transmitted to the plurality of receiving communication apparatuses. Thus, when the data are not received properly on the receiving communication apparatus connected to a transmission path having a poor transmission status, or contrary when the data are transmitted in a transmission scheme resistant to noise, the transfer capacity may decrease more than necessary, thus hampering efficient transmission.

Communication apparatus 100X of the third embodiment therefore obtains reception information that shows a reception status from each of communication apparatuses 100A and 100B, which are at least included in a group for multicast communication. Based on the reception status indicated in the reception information, communication apparatus 100X then determines a transmission scheme of the transmitted data for multicast communication to communication apparatuses 100A and 100B. Thereby, the multicast communication data can be delivered effectively, according to the transmission status of each of the transmission paths. In the third embodiment, the transmission scheme means a whole scheme of data transmission for the receiving communication apparatus, including a communication scheme, such as broadcast communication, multicast communication, and unicast communication; a modulation scheme; a multiplexing scheme; and the like.

As shown in FIG. 18, communication apparatus 100X includes receiver 40, which functions as an example of a reception information obtaining unit; transmitter 20; and transmission processor 30. Communication apparatus 100A includes receiver 40, transmitter 20, CNR calculator 50, and channel estimation unit 60. Although not shown in the drawing, communication apparatus 100B, which has a similar configuration to communication apparatus 100A, is connected to communication apparatus 100X, as shown in FIG. 13.

Figure 19:
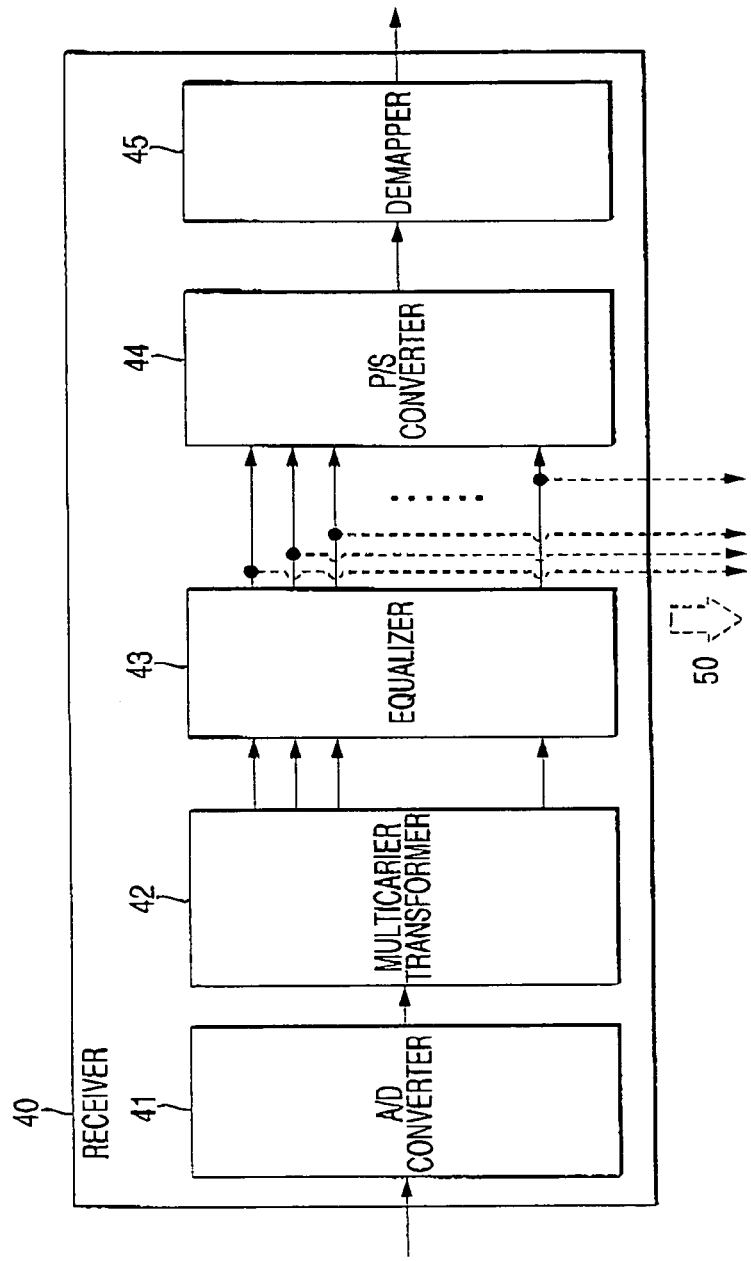
FIG. 19 is a block diagram illustrating a general configuration of a receiver in the communication apparatus according to the third embodiment.

As shown in FIG. 19, receiver 40 of communication apparatuses 100X and 100A includes: A/D converter 41, which converts an input analog signal into a digital signal; multicarrier transformer 42, which performs desired time-to-frequency transform, such as a Fourier transformer (FFT), a wavelet transformer (DWT), and the like; equalizer 43, which corrects a received signal so as to cancel an effect of the transmission line; P/S converter 44, which converts parallel data into serial data; and demapper 45, which converts mapped symbol data into bit data, that is, a received signal.

Figure 20:
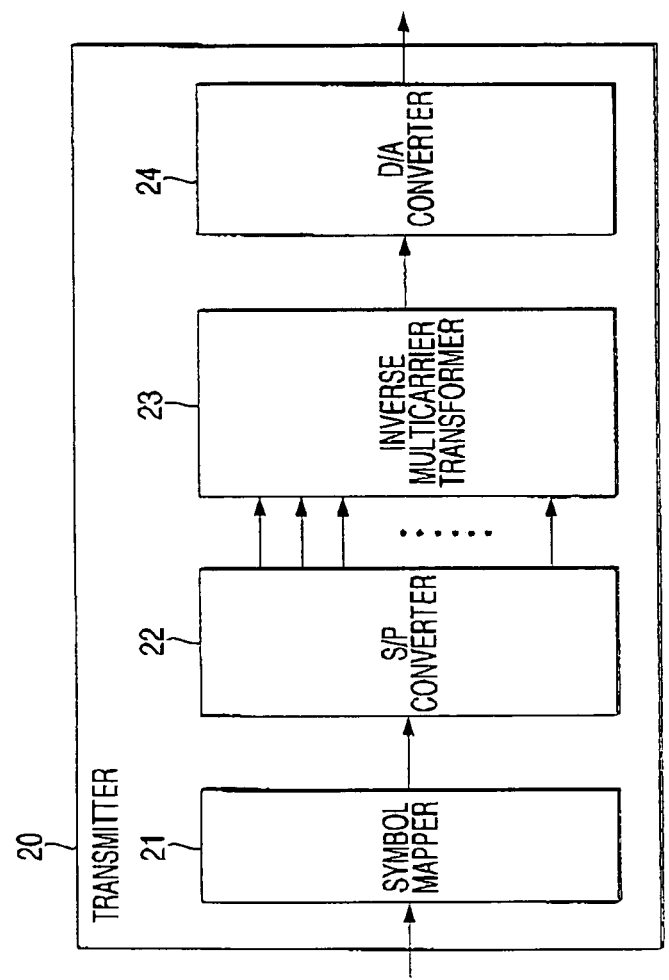
FIG. 20 is a block diagram illustrating a general configuration of a transmitter in the communication apparatus according to the third embodiment.

As shown in FIG. 20, transmitter 20 of communication apparatuses 100X and 100A includes: symbol mapper 21, which converts bit data, that is, a transmitted signal, into symbol data for symbol mapping; S/P converter 22, which converts serial data into parallel data; inverse multicarrier transformer 23, which performs desired frequency-to-time transform, such as an inverse Fourier transformer (IFFT), an inverse wavelet transformer (IDWT), and the like; and D/A converter 24, which converts a digital signal output from inverse multicarrier transformer 23 into an analog signal.

On communication apparatus 100A, CNR calculator 50 calculates a carrier-to-noise ratio (hereinafter referred to as CNR) of each subcarrier, based on the output from equalizer 43 of receiver 40. Based on the noise level of the received signal calculated by CNR calculator 50, channel estimation unit 60 sets a modulation scheme used for each subcarrier, and outputs to transmitter 20 a value that indicates the modulation scheme as a tone map. Transmitter 20 transmits the input tone map to communication apparatus 100X. Channel estimation unit 60 does not need to set the modulation scheme per subcarrier. Subcarriers to be used may be divided into a plurality of groups, and the modulation scheme may be set per group of the subcarriers.

Transmitter 30 of communication apparatus 100X includes: transmission rate calculator 31, tone map combining unit 32, transmission scheme determining unit 33, and multicast-to-unicast converter (hereinafter referred to as MC-UC converter) 34. Based on the reception information obtained from receiver 40, MC-UC converter 34 determines a data transmission scheme for multicast communication targeted for receiving communication apparatuses 100A and 100B.

Based on tone maps transmitted from receiving communication apparatuses 100A and 100B, transmission rate calculator 31 computes a transmission rate for each of transmission paths XA and XB. The transmission rate may be computed directly from the tone map. It is preferable, however, to compute the rate excluding a redundant signal, such as a frame structure, a control signal, and the like.

Tone map combining unit 32 combines the tone maps transmitted from communication apparatuses 100A and 100B. More specifically, tone map combining unit 32 compares modulation schemes (modulation levels) of the subcarriers per communication apparatus, based on the tone maps transmitted from communication apparatuses 100A and 100B; and selects a lowest modulation scheme. The modulation scheme does not need to be fixed to the selected lowest modulation scheme. When a retry ratio is lower than a predetermined value, for instance, the modulation level may be increased.

For example, when 2 PAM (Pulse Amplitude Modulation) is specified to subcarrier number 100 on the tone map from communication apparatus 100A, and 8 PAM to subcarrier 100 on the tone map from communication apparatus 100B, 2 PAM is set to subcarrier 100 on the combined tone map. When 8 PAM (Pulse Amplitude Modulation) is specified to subcarrier number 150 on the tone map from communication apparatus 100A, and 2 PAM to subcarrier 150 on the tone map from communication apparatus 100B, 2 PAM is set to subcarrier 150 on the combined tone map. The combined tone map is generated as described above.

Assigning the transmission scheme, such as the modulation scheme suitable for a reception status having worst characteristics among reception statuses obtained from the subcarriers (or the subcarrier groups) and the like, to the combined tone map as described above, enables data reception on both of target receiving communication apparatuses 100A and 100B, and allows efficient multicast communication according to the reception statuses.

Transmission scheme determining unit 33 determines the data transmission scheme for multicast communication, based on the transmission rate calculated by transmission rate calculator 31 or the combined tone map output from tone map combining unit 32.

Based on an instruction from transmission scheme determining unit 33, MC-UC converter 34 converts multicast communication data (a multicast signal) into unicast communication data (a unicast signal) as required.

Operations of the communication system having the above-described configuration are described below.

Figure 21:
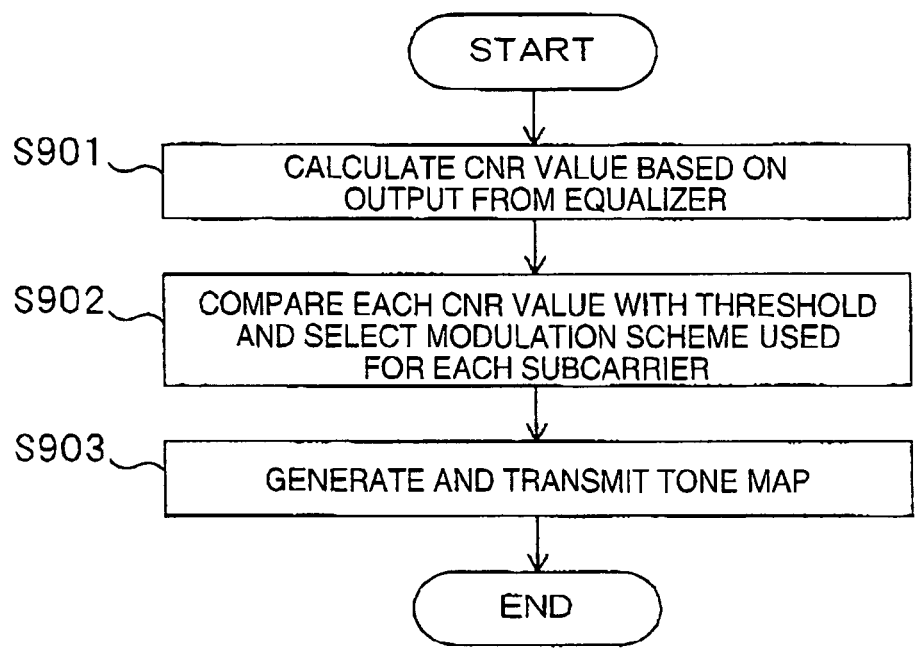
FIG. 21 illustrates a processing procedure of channel estimation on a receiving communication apparatus according to the third embodiment.

As shown in FIG. 21, on receiving communication apparatuses 100A and 100B, CNR calculator 50 calculates CNR of each subcarrier, based on the output from equalizer 43 of receiver 40 (step S901). Next, channel estimation unit 60 compares the CNR value calculated by CNR calculator 50 with a threshold, and determines a modulation scheme for each subcarrier (step S902). Then, channel estimation unit 60 generates a tone map having a value that indicates the modulation scheme determined per subcarrier, and transmits the tone map to communication apparatus 100X through transmitter 20 (step S903).

Figure 22:
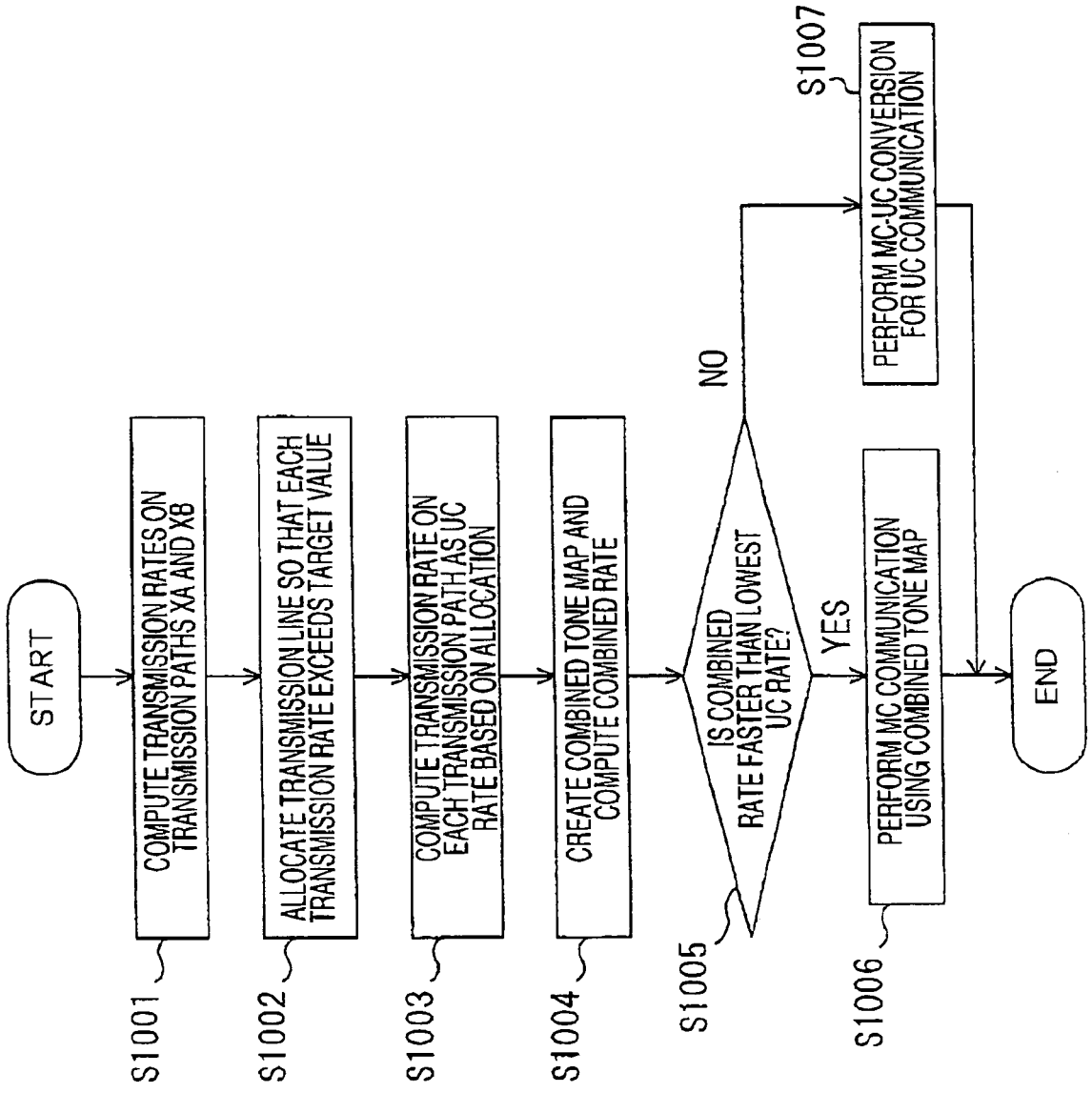
FIG. 22 is a first example of a processing procedure for determining a transmission scheme on a transmitting communication apparatus according to the third embodiment.

A process for determining the transmission scheme on the transmitting communication apparatus is a process for determining which of multicast communication or unicast communication is suitable for transmission. An overview of a process in FIG. 22 is described first.

For example, transmission rates on transmission paths XA and XB obtained from communication apparatuses 100A and 100B are assumed 50 Mbps each. In this case, since data frames do not need to be transmitted separately per receiving apparatus in multicast communication using a combined tone map, as explained in FIG. 14B, communication apparatuses 100A and 100B are capable of transmitting the data with no error at a maximum rate of 50 Mbps (hereinafter, "capable of transmitting data with no error" at a predetermined transmission rate is described as "capable of receiving a service" at the transmission rate). However, in unicast communication, where multicast-to-unicast conversion (hereinafter referred to as MC-UC conversion) is performed for multicast transmission data, the data frames need to be transmitted separately per receiving apparatus, as explained in FIG. 14A. Thus, when allocation of transmission bands to communication apparatuses 100A and 100B is assumed 1:1 (i.e., 25 Mbps:25 Mbps), each of communication apparatuses 100A and 100B can only receive a service of 25 Mbps at maximum.

Next, the transmission rates on transmission paths XA and XB obtained from communication apparatuses 100A and 100B are assumed 50 Mbps and 30 Mbps respectively. In this case, communication apparatuses 100A and 100B are capable of receiving a service of 30 Mbps at maximum in multicast communication using the combined tone map. However, in unicast communication, where MC-UC conversion is performed for the multicast transmission data, each of communication apparatuses 100A and 100B can use the transmission line for a half the time, that is, communication apparatus 100A can receive a service of 25 Mbps at maximum, and communication apparatus 100B can receive a service of 15 Mbps (i.e., 25 Mbps×30/50). In this case, a total capacity is 40 Mbps at maximum, which is larger than the capacity in multicast communication using the combined tone map.

However, when a required bandwidth for multicast communication is assumed 20 Mbps, receiving terminal 600B connected to communication apparatus 100B cannot even receive the service itself. In an actual environment, the bandwidth for multicast communication may already be set to the service itself (e.g., 4 Mbps or more for MPEG2 streaming playback). The bandwidth required for multicast is referred to as the required bandwidth. The explanation herein is based on a required bandwidth of 20 Mbps.

When the bandwidth of transmission path XA is set to 20 Mbps, the bandwidth of transmission path XB is 18 Mbps (i.e., 30 Mbps×30/50). When one of the transmission paths (in this case, transmission path XA) is set to the bandwidth required for multicast, the transmission bands (20 Mbps) allocated to communication apparatuses 100A and 100B are at a proportion of 4:6 (i.e., 20 Mbps:30 Mbps). Still, the bandwidth of transmission path XB is less than 20 Mbps, thus unable to receive the multicast service that requires 20 Mbps. As described above, the total capacity tends to be large in MC-UC conversion, compared with the combined tone map. It is thus difficult in most of the cases to provide the multicast service to the plurality of receiving terminals 600A and 600B simultaneously.

In MC-UC conversion, therefore, allocation of the transmission bands to the plurality of receiving communication apparatuses is determined, so that the transmission bands exceed a target value (e.g., a rate threshold required for the multicast service) on all the transmission paths. For example, the transmission bands are first evenly allocated to the communication apparatuses, and then the transmission rates are calculated individually. When all the transmission rates meet the required bandwidth, the transmission bands are determined to be evenly allocated to each communication apparatus. When any of the transmission rates on the communication apparatus does not meet the required bandwidth, the communication apparatus having the transmission rate of more than the required bandwidth is re-allocated so that the transmission rate is equal to the required bandwidth. Thus, the allocation of the transmission band to each communication apparatus is determined.

Based on the allocation, the transmission rate on each transmission path is computed as a unicast transmission rate (hereinafter referred to as a UC rate). Then, a lowest value among the UC rates and the multicast transmission rate (hereinafter referred to as the MC rate), which is used in multicast communication using the combined tone map, are compared, and a higher rate is used.

Described below are procedures of the above-described process. Transmission rate calculator 31 first computes the transmission rate on each of transmission paths XA and XB, based on the tone map obtained from each of communication apparatuses 100A and 100B through receiver 40 (step S1001).

Then, based on the transmission rate computed in step S1001, transmission scheme determining unit 33 sets allocation of the transmission bands for transmission to communication apparatuses 100A and 100B, so that the transmission rates on transmission paths XA and XB exceed the target value in unicast communication for communication apparatuses 100A and 100B (step S1002).

Transmission scheme determining unit 33 then computes the transmission rate on each transmission path as the UC rate, based on the allocation set in step S1002 (step S1003).

Tone map combing unit 32 combines the tone maps transmitted from communication apparatuses 100A and 100B and generates the combined tone map. Then, transmission scheme determining unit 33 computes the MC rate in multicast communication using the combined tone map (step S1004).

Then, the computed MC rate and lowest UC rate are compared (step S1005). When the MC rate is greater than the lowest UC rate (step S1005: Yes), the multicast transmission data output from server 500 are transmitted to power lines PL through transmitter 20 using the combined tone map. Thus, the data are delivered to receiving terminals 600A and 600B via communication apparatuses 100A and 100B in multicast communication.

On the other hand, when the lowest UC rate is less than the MC rate (step S1005: No), MC-UC converter 34 converts the multicast transmission data output from server 500, from multicast to unicast. Based on the allocation set in step S1002, the data are output to power lines PL through transmitter 20. Thereby, the data are delivered to receiving terminals 600A and 600B via communication apparatuses 100A and 100B in unicast communication.

Multicast communication or unicast communication is selected as described above to transmit the data, thus allowing efficient multicast data distribution according to the transmission status. Further, the transmission scheme is determined based on a condition where the transmission rate meets the rate threshold, such as the target value and the like, thus ensuring the transmission rate required for data distribution in multicast communication and then allowing efficient distribution according to the transmission status.

The process for determining the transmission scheme on the transmitting communication apparatus is a process for determining whether each transmission path is suitable for multicast communication in terms of a retry ratio, when multicast communication is selected in the process of FIG. 22.

When the retry ratio is high on each of the transmission paths in unicast communication, it is highly likely that the retry ratio may be high even in multicast communication using the combined tone map. When retransmission occurs frequently in multicast communication, the transmission efficiency may eventually be aggravated more than in unicast communication. Thus, in the process, the retry ratio on each transmission path is calculated in advance, and multicast communication or unicast communication is selected.

Figure 23:
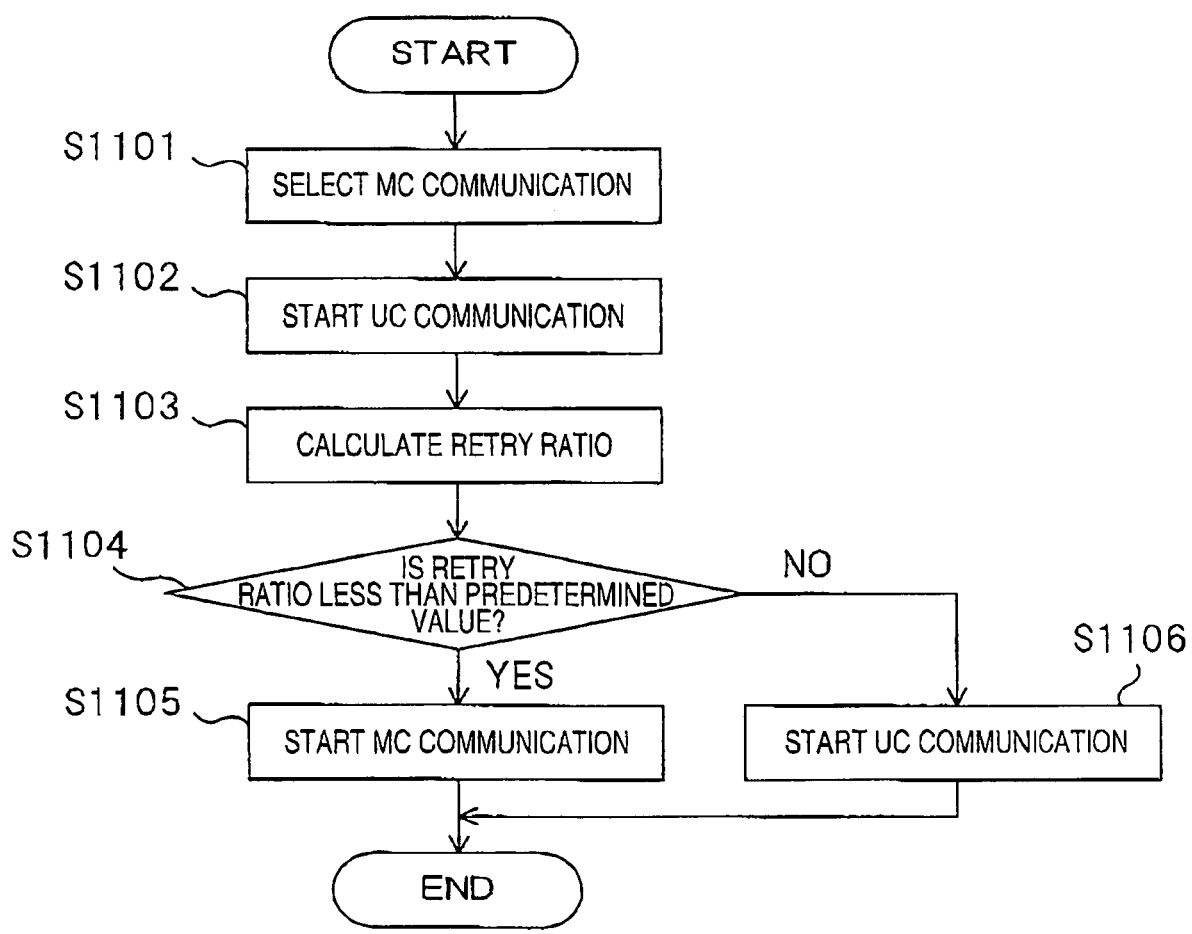
FIG. 23 is a second example of the processing procedure for determining the transmission scheme on the transmitting communication apparatus according to the third embodiment.

As shown in FIG. 23, when multicast communication is selected in step S1006 of FIG. 22 (step S1101), transmission scheme determining unit 33 selects unicast communication and performs unicast communication through MC-UC converter 34 to each of communication apparatuses 100A and 100B (step S1102).

Then, transmission scheme determining unit 33 computes the retry ratio based on a retry request transmitted from each of communication apparatuses 100A and 100B (step S1103), and compares the retry ratio with a predetermined threshold (e.g., 10%; step S1104). When the retry ratio is less than the threshold (step S1104: Yes), transmission scheme determining unit 33 selects multicast communication. When the retry ratio is greater than the threshold (step S1104: No), transmission scheme determining unit 33 selects unicast communication Thereby, performing multicast communication on the transmission path on which retransmission occurs infrequently allows efficient distribution of multicast data according to the transmission status.

Instead of actually calculating the retry ratio, the retry ratio in communication between the communication apparatuses may be estimated, based on monitoring of tone maps for a plurality of times and calculating of variations in fluctuations. For example, communication apparatuses 100A and 100B transmit the tone maps for the plurality of times within a cycle or half a cycle of a commercial power frequency. When a fluctuation range is less than a predetermined value, multicast communication is performed. When the fluctuation range is greater than the predetermined value, multicast-to-unicast conversion is performed for communication. An error rate may be used instead of the retry ratio.

When the fluctuation in the reception status is significant on the receiving communication apparatus, retransmission tends to increase. Thus, performing multicast communication on the transmission line on which retransmission occurs less frequently, based on monitoring of the fluctuation in the reception status allows efficient distribution of multicast data according to the transmission status.

Described below is a process for switching the transmission scheme when multicast communication is selected based on the transmission scheme determining process on the transmitting communication apparatus, and, after multicast communication actually starts, retransmission occurs frequently.

Figure 24:
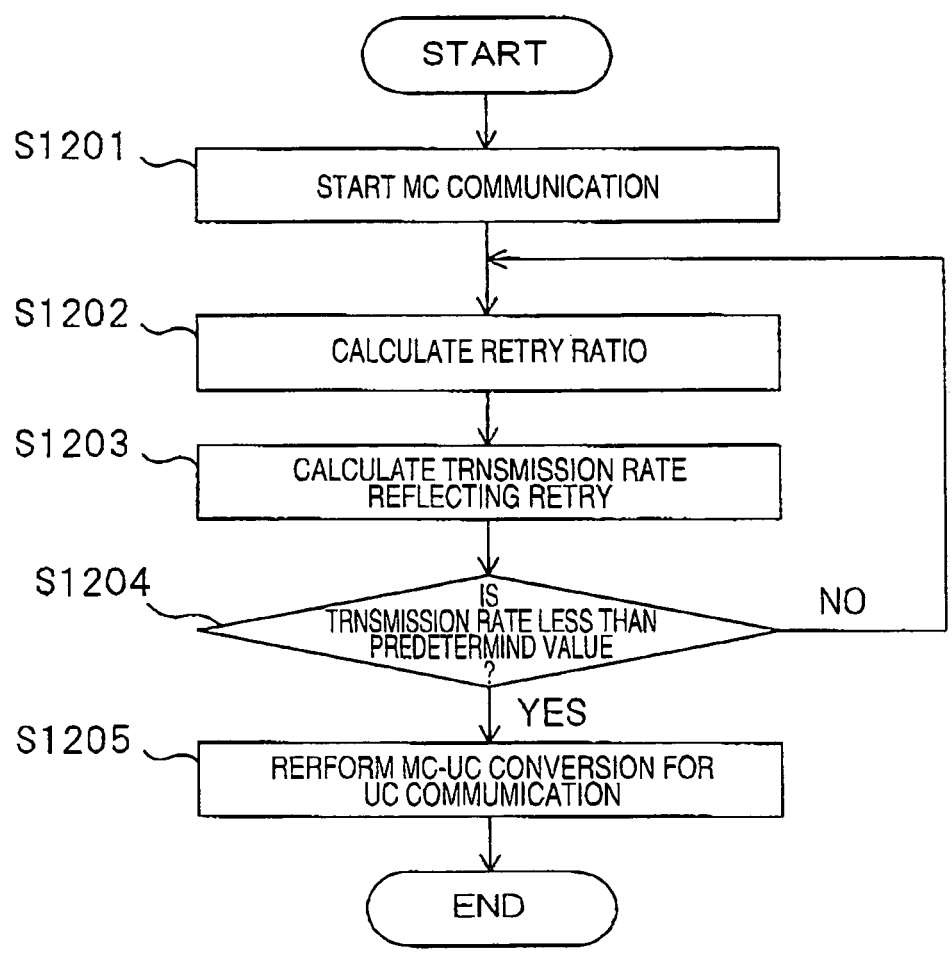
FIG. 24 is a third example of the processing procedure for determining the transmission scheme on the transmitting communication apparatus according to the third embodiment.

As shown in FIG. 24, when multicast communication starts (step S1201), transmission scheme determining unit 33 computes the retry ratio based on the retry request from each of communication apparatuses 100A and 100B (step S1202), and computes the transmission rate reflecting the retry ratio for each of transmission paths XA and XB (step S1203). Then, transmission scheme determining unit 33 compares each transmission rate with a predetermined value (step S1204) When the transmission rate is greater than the predetermined value (step S1204: No), transmission scheme determining unit 33 returns to step S1202. When either of the transmission rates on transmission paths XA and XB is less than the predetermined value (step S1204: Yes), transmission scheme determining unit 33 switches to unicast communication (step S1205).

As described above, when retransmission occurs frequently, the transmission scheme is switched appropriately, thus allowing data distribution according to the transmission status.

Instead of calculating the retry ratio after multicast communication starts, an actual transmission rate including the retry ratio may be calculated based on actual communication during rate calculation in the process in FIG. 22.

Figure 25:
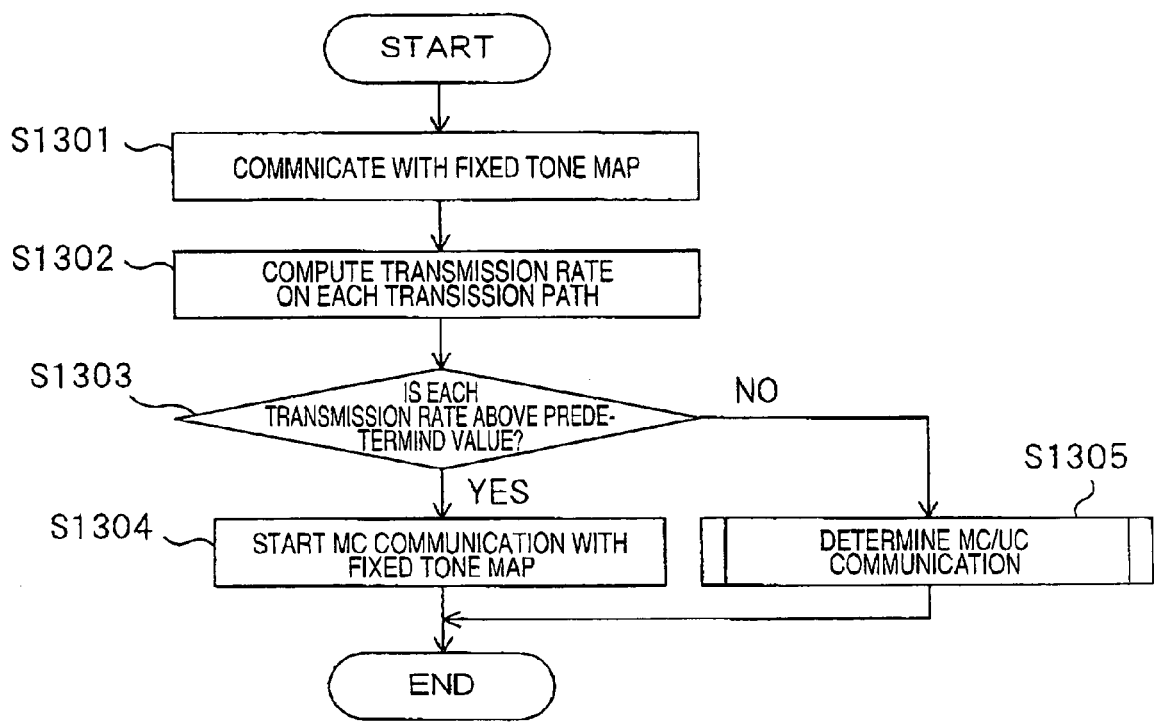
FIG. 25 is a fourth example of the processing procedure for determining the transmission scheme on the transmitting communication apparatus according to the third embodiment.

FIG. 25 is a fourth example of the processing procedure for determining the transmission scheme on the transmitting communication apparatus according to the third embodiment.

As shown in FIG. 25, transmission scheme determining unit 33 performs multicast or unicast communication using a fixed tone map (step S1301). A predetermined transmission scheme of a modulation level and the like used for the fixed tone map is determined based on a target value in multicast communication, for example. When a high rate is required, 8 PAM or 64 QAM is used. When a low rate is acceptable, 2 PAM or QPSK may be used. Further, error correction performance may be changed according to the target value. Thus, stronger error correction can be applied to the low rate.

Then, transmission rate calculator 31 computes the transmission rate on each of transmission paths XA and XB in communication using the fixed tone map (step S1302). Transmission scheme determining unit 33 compares computed rates on all the transmission paths with a predetermined value (step S1303).

When the transmission rates computed in step S1302 are greater than the predetermined value (step S1303: Yes), the transmission scheme determining unit uses the fixed tone map and starts multicast communication (step S1304). On the other hand, when at least one of the transmission rates computed in step S1302 is less than the predetermined value (step S1303: No), the transmission scheme determining unit performs a process for determining multicast or unicast communication (step S1305). Step S1305 is a process from steps S1001 to S1007 in FIG. 22.

Thereby, for example, the multicast communication data are transmitted in a modulation scheme or the like at the transmission rate sufficient for data communication delivered in multicast communication. Then, when the reception status is good, data distribution continues in the transmission scheme, thus eliminating a complex process for data communication.

Figure 26:
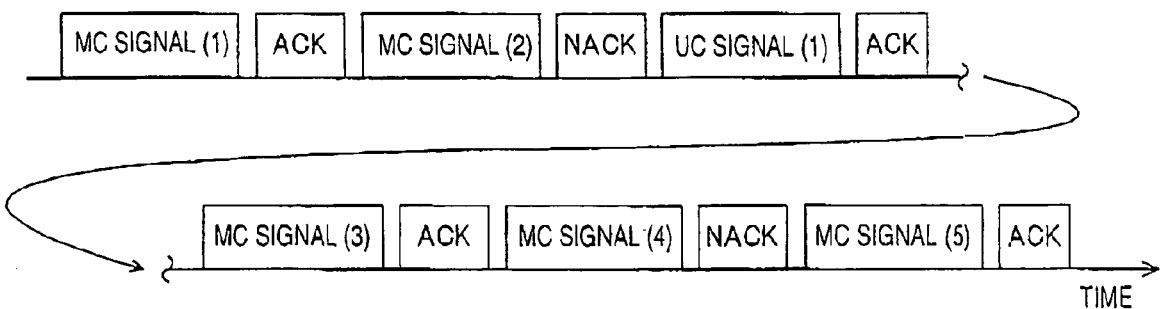
FIG. 26 is a first example of a transmission method of retransmitted data on the transmitting communication apparatus according to the third embodiment.

Described next is a method for retransmitting data when a retry request is issued. An example in FIG. 26 shows a case where the transmitting communication apparatus transmits retransmitted data in unicast communication every time when receiving a retry request.

For example, when transmitting communication apparatus 100X transmits MC signal (2), and cannot receive a response to the transmission or receives negative acknowledgement (NACK) from a receiving apparatus, indicating that the reception has failed, transmitting communication apparatus 100X transmits data identical to MC signal (2) as UC signal (1) in unicast communication.

Thereby, the data that need to be retransmitted are transmitted in unicast communication in the transmission scheme suitable for a reception status only of a target receiving communication apparatus, thus enabling efficient transmission of the retransmitted data.

Figure 27:
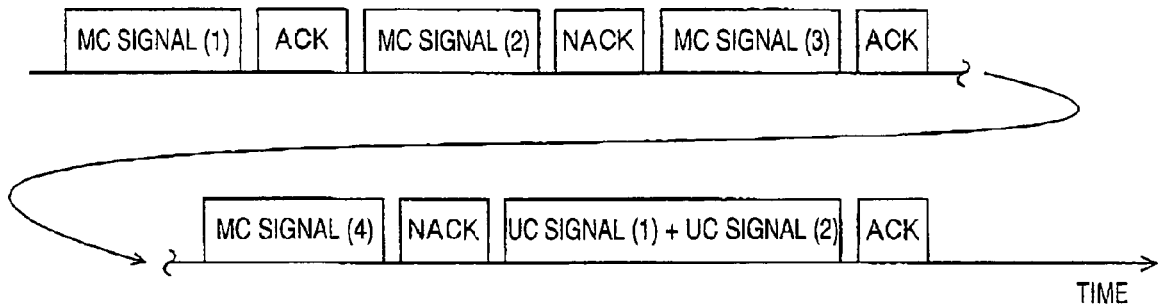
FIG. 27 is a second example of the transmission method of retransmitted data on the transmitting communication apparatus according to the third embodiment.

In an example in FIG. 27, transmission scheme determining unit 33 of transmission processor 30 links the data required to be retransmitted within a predetermined period, and transmits the data in unicast communication.

For example, transmission scheme determining unit 33 transmits MC signals (1) to (4) irrespective of response while transmitting MC signals (1) to (4). Then, when negative acknowledgement NACK is transmitted, transmission scheme determining unit 33 links the data associated with MC signals (2) and (4), for which retransmission is requested, and transmits UC signals (1) and (2) at one time. Since a redundant signal, which is added to a packet in addition to data, such as a preamble signal, a control signal, and the like, is reduced in total, the transmission line can be used more efficiently in retransmission.

Even in normal multicast communication and unicast communication, it is preferable that data, such as an Ethernet packet (a maximum of about 1,500 bytes per packet) and the like, be linked whenever possible, in order to increase the transmission efficiency.

As described above, when retransmission occurs frequently, the transmission efficiency deteriorates for the amount of retransmission, and the redundant signal further deteriorates the efficiency. To address the problem, the threshold used for generating a combined tone map on tone map combining unit 32 may be shifted to a safe and error-free side, or the error correction performance on transmission scheme determining unit 33 may be changed to a resilient scheme.

Further, channel estimation for multicast may be performed differently from channel estimation for unicast on receiving communication apparatuses 100A and 100B. In this case, the threshold for determining a modulation scheme may be provided with a margin more than the threshold for unicast communication, and a tone map may be generated using the threshold, so as to allow stronger error correction. Channel estimation for multicast may be performed at a request of multicast communication, or may be determined along with channel estimation for unicast communication.

When there are a number of communication apparatuses in a group for multicast communication, when multicast communication cannot be performed, or when unicast communication is performed to all communication apparatuses, the transmission rate significantly decreases as a whole. In this example, the communication apparatuses in the group for multicast communication are further divided into a plurality of subgroups, and a transmission scheme for transmitted data is determined for each of the subgroups.

Figure 28:
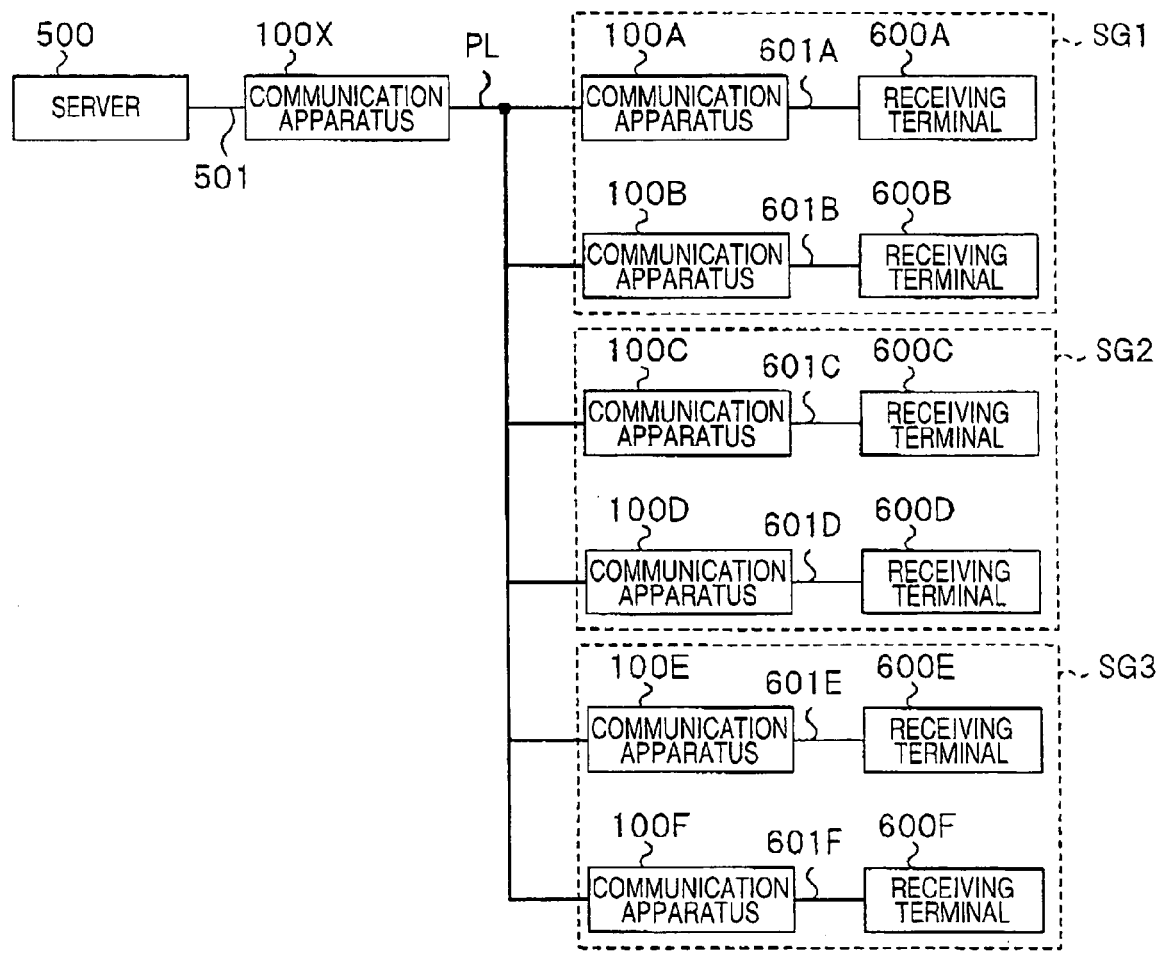
FIG. 28 is a block diagram illustrating a different example of an overview of the communication system according to the third embodiment.

As shown in FIG. 28, a group for multicast communication includes communication apparatuses 100A, 100B, 100C, 100D, 100E, and 100F In this case, the transmission scheme determining unit of communication apparatus 100X sets subgroups of two communication apparatuses as a pair, for example (subgroup SG1 including communication apparatuses 100A and 100B, subgroup SG2 including communication apparatuses 100C and 100D, and subgroup SG3 including communication apparatuses 100E and 100F).

The processes shown in FIGS. 22 to 25 are performed for each of subgroups SG1, SG2, and SG3. For example, transmission scheme determining unit 33 determines which of multicast communication or unicast communication for the two communication apparatuses in each subgroup, and selects unicast communication for the subgroup for which unicast communication is selected. Further, transmission scheme determining unit 33 determines multicast communication or unicast communication for the subgroups for which multicast communication is selected (e.g., two each), and selects unicast communication for the subgroups for which unicast communication is selected.

As described above, the transmission scheme is determined per subgroup. Thereby, when there are a number of receiving communication apparatuses, multicast communication and unicast communication can be used simultaneously depending on the subgroup, for example, thus allowing more efficient data distribution.

It is preferable that transmission scheme determining unit 33 set communication apparatuses that use transmission lines having similar transmission statuses as a same subgroup, based on parameters that directly or indirectly indicate the transmission statuses, such as a rate, a retry ratio, average CNR, an error rate and the like.

The tone map is used in the explanations above as an example of the reception information that shows the reception status in which receiving communication apparatuses 100A and 100B transmit to transmitting communication apparatus 100X. However, also acceptable is information that shows the reception status of the receiving communication apparatus, including noise characteristics, such as CNR, a signal-to-noise ratio (SNR), and the like; reception field intensity; and B&G defined in ITU-T SG15 G.992.1 recommendations, and the like.

Further, described above is a case where the transmission rate on each transmission path is computed on transmission rate calculator 31 of transmitting communication apparatus 100X. However, the transmission rate may be computed after channel estimation on receiving communication apparatuses 100A to 100F.

Described below is a specific configuration of communication apparatuses 100X and 100A to 100F related to the above described embodiment, which are represented as communication apparatus 100.

Figure 29:
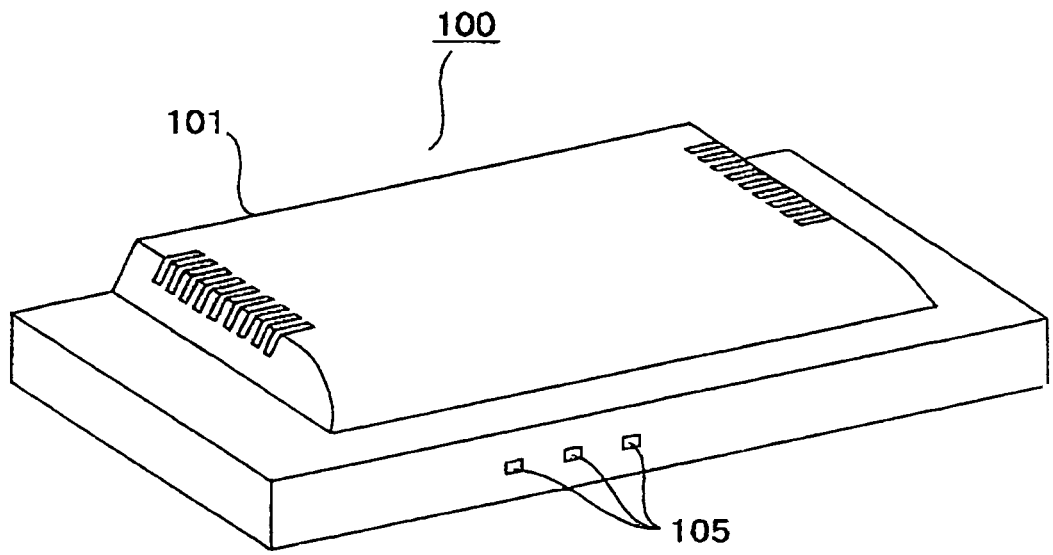
FIG. 29 is an external perspective view illustrating a front side of the communication apparatus according to the third embodiment.
Figure 30:
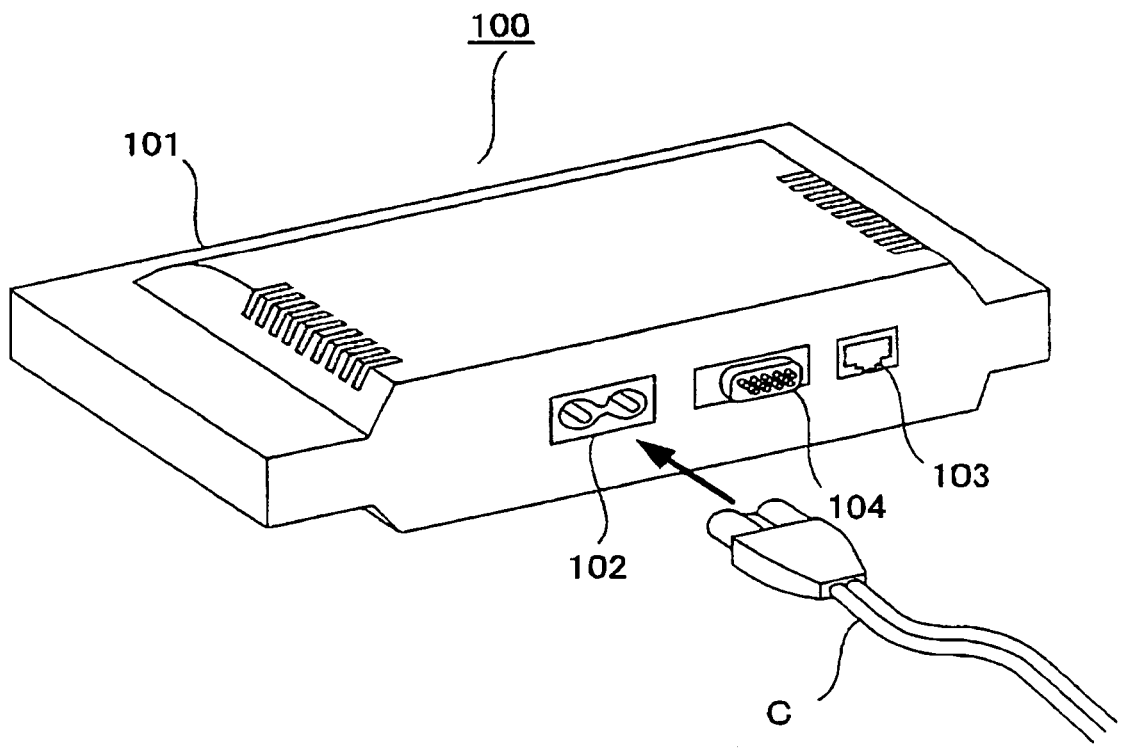
FIG. 30 is an external perspective view illustrating a rear side of the communication apparatus according to the third embodiment.

Communication apparatus 100 includes case 101. Provided on a front side of case 101 is display 105 having LEDs as shown in FIG. 29. Provided on a rear side of case 101 are power connector 102; LAN (Local Area Network) modular jack 103, such as RJ-45; and D-sub connector 104. AC power cord C, such as a parallel cable, is connected to power connector 102 as shown in FIG. 30. A LAN cable (not show in the drawing) is connected to modular jack 103. A D-sub cable (not shown in the drawing) is connected to D-sub connector 104. A modem shown in FIGS. 29 and 30 is used as an example of the communication apparatus. However, the communication apparatus is not limited to the modem, but may be an electric device (e.g., an electric appliance, such as a TV set) provided with a modem.

Figure 31:
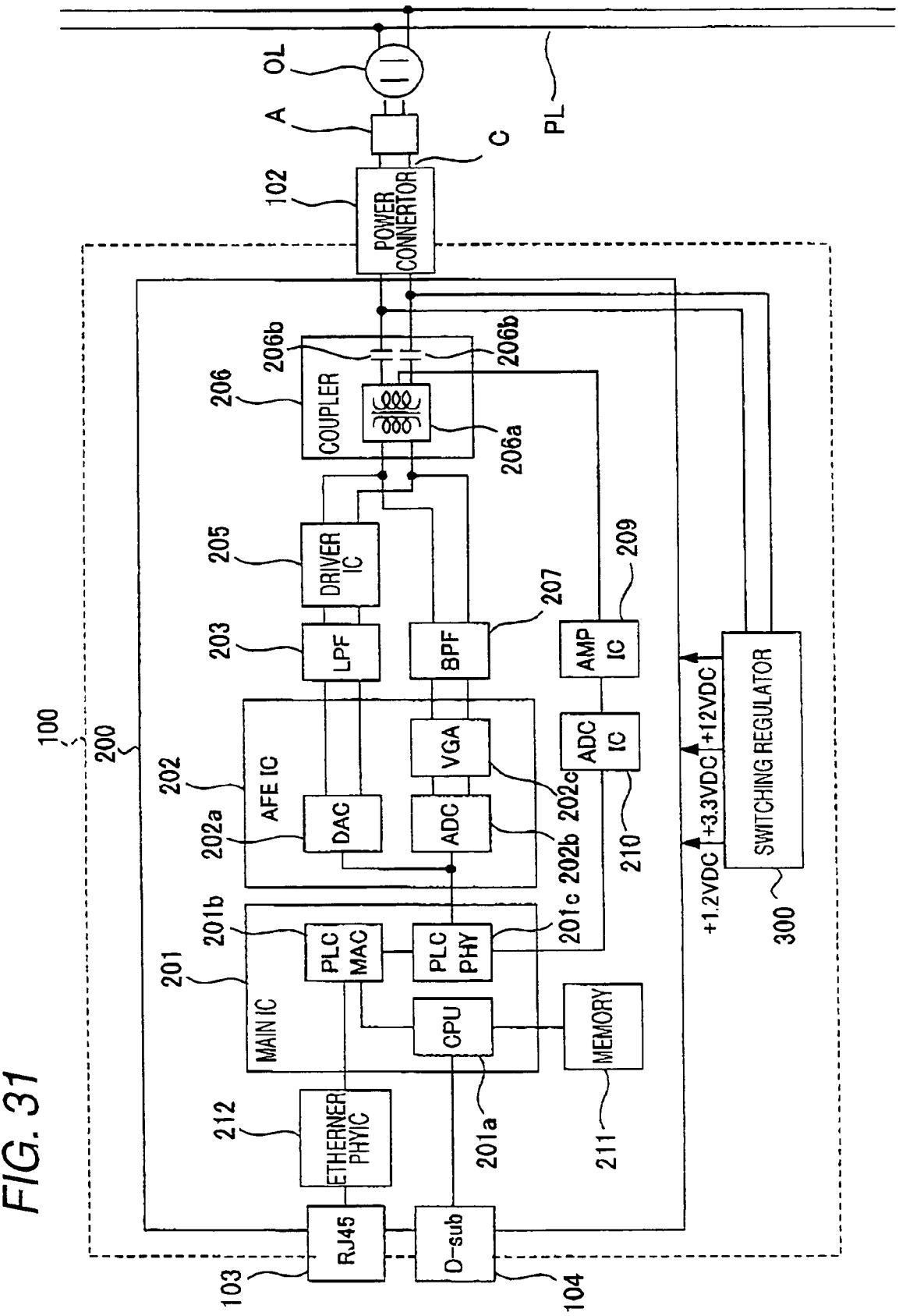
FIG. 31 is a block diagram illustrating a hardware example of the communication apparatus according to the third embodiment.

As shown in FIG. 31, communication apparatus 100 includes circuit module 200 and switching regulator 300. Switching regulator 300 supplies a voltage of +1.2V, +3.3V, or +12V to circuit module 200.

Provided on circuit module 200 are main IC (Integrated Circuit) 201, AFE IC (Analog Front End IC) 202, low pass filter (LPF) 203, driver IC 205, coupler 206, band pass filter (BPF) 207, AMP (amplifier) IC 209, ADC (AD conversion) IC 210, memory 211, and Ethernet physical layer IC (PHY IC) 212.

Main IC 201 includes CPU (Central Processing Unit) 201$a$, PLC MAC (Power Line Communication Media Access Control) block 201$b$, and PLC PHY (Power Line Communication Physical layer) block 201$c$. AFE IC 202 includes D/A converter (DAC) block 202$a$, A/D converter (ADC) block 202$b$, and variable gain amplifier (VGA) block 202$c$. Coupler 206 includes coil transformer 206$a$ and capacitor 206$b$.

On main IC 201, PLC MAC block 201$b$ has a function of transmission processor 30; PLC PHY block 201$c$ has functions of multicarrier transformer 42, equalizer 43, P/S converter 44, demapper 43, symbol mapper 21, S/P converter 22, inverse multicarrier transformer 23, CNR calculator 50, and channel estimation unit 60.

On AFE IC 202, DAC block 202$a$ has a function of D/A converter 24; ADC block 202$b$ has a function of A/D converter 42; and VGA block 202$c$ has a function of an AGC circuit.

In the third embodiment, the communication apparatus that uses the power line as the transmission line and that performs wideband communication (2 to 30 MHz) in the multicarrier communication system is used as an example of the communication apparatus. For the communication apparatus of the third embodiment, however, the communication system is not limited to the multicarrier communication system, but may be a single carrier communication system or a spread spectrum system. Further, the transmission line is not limited to the power line, and may be a transmission line used for other ordinary communication, as far as power line communication via an electrical outlet is applied for setting with an external communication device For example, transmission lines, such as a coaxial cable, a telephone line, a speaker line, or a harness, may be used.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application Nos. 2005-339962 filed on Nov. 25, 2005, and 2005-326268 filed on Nov. 10, 2005, entire contents of which are expressly incorporated by reference herein.

What is claimed is:

1. A power line communication apparatus for transmitting a packet to another power line communication apparatus through a power line, said power line communication apparatus comprising:
   a receiver for receiving the packet, which is transmitted using a first transmission mode, having a first address used for multicast as a destination address;
   a packet converter for converting the first address of the packet received by the receiver into a second address used for unicast;
   a modulation scheme setting unit for setting a modulation scheme of the packet, which corresponds to a second transmission mode which has a higher transmission rate than the first transmission mode, in accordance with a noise status of the power line between said power line communication apparatus and said other power line communication apparatus on the basis of the conversion;
   a transmission rate measuring unit for measuring a transmission rate of the packet at a first time interval;
   a transmission rate controller for controlling the transmission rate on the basis of the measured transmission rate; and
   a packet transmitter for transmitting, to said other power line communication apparatus, the packet having the second address, based on the modulation scheme set by the modulation scheme setting unit,
   wherein the transmission rate measuring unit changes the first time interval into a second time interval which is shorter than the first time interval on the basis of the measured transmission rate.

2. The power line communication apparatus according to claim 1, further comprising:
   a memory for storing information representing a relationship between the second address for unicast and the first address for multicast, wherein:
   the packet converter converts the first address for multicast into the second address represented in the information.

3. The power line communication apparatus according to claim 2, further comprising:
   a snooping unit for reading out a multicast MAC address of an IP device from an IGMP (Internet Group Management Protocol) packet, when the IGMP packet is transmitted from the IP device connected under the power line communication apparatus; and
   a transmission/reception management controller for setting a conversion table having a source PLC MAC address of the IGMP packet as the second address, and the multicast MAC address as the first address.

4. The power line communication apparatus according to claim 3, wherein a multicast IP address and a PLC IP address are used instead of the multicast MAC address and the PLC MAC address respectively.

5. The power line communication apparatus according to claim 3, wherein the conversion table is a MAC address table on which the multicast MAC address is associated with the source PLC MAC address of the IGMP packet.

6. The power line communication apparatus according to claim 1, further comprising:
   a bandwidth controller for selecting a predetermined transmission band, wherein:
   the bandwidth controller allocates the transmission band for communication and fixes a transmission rate with the allocated transmission band when receiving a multicast packet from a server.

7. The power line communication apparatus according to claim 6, wherein the transmission band is allocated as a band of a predetermined transmission time in TDMA (time division multiple access).

8. The power line communication apparatus according to claim 6, wherein the transmission band is allocated as a predetermined frequency band in FDMA (frequency division multiple access).

9. The power line communication apparatus according to claim 6, wherein the bandwidth controller releases the transmission band when receiving from an IP device an IGMP packet for leaving a multicast group.

10. The power line communication apparatus according to claim 6, wherein the bandwidth controller releases the transmission band through aging.

11. The power line communication apparatus according to claim 1, wherein conversion information is deleted after being invalidated for a predetermined time, when receiving from an IP device an IGMP packet for leaving a multicast group.

12. The power line communication apparatus according to claim 6, further comprising:
   a transmission status measuring unit for monitoring a transmission rate to calculate an average transmission rate, wherein:
   a transmission band is changed when there is a difference between the average transmission rate and the fixed transmission rate.

13. The power line communication apparatus according to claim 6, wherein the transmission band is allocated when conversion information is set to a conversion table; and the transmission band is not allocated for forwarding when no conversion information is set.

14. A power line communication method for communicating between a power line communication apparatus and another power line communication apparatus through a power line, said power line communication method comprising:
   receiving a packet, which is transmitted using a first transmission mode, having a first address used for multicast as a destination address;
   converting the first address of the received packet into a second address used for unicast;
   setting a modulating scheme of the packet, which corresponds to a second transmission mode which has a higher transmission rate than the first transmission mode, in accordance with a noise status of the power line between said power line communication apparatus and said other power line communication apparatus on the basis of the converting;
   measuring a transmission rate of the packet at first time intervals;
   controlling the transmission rate on the basis of the measured transmission rate;

transmitting, to the other power line communication apparatus, the packet having the second address, based on the setting of the modulation scheme; and changing the first time interval into a second time interval which is shorter than the first time interval on the basis of the measured transmission rate.

15. The power line communication apparatus according to claim 1, further comprising:

a switching regulator for supplying a voltage to the receiver.

* * * * *